(12) United States Patent
Matsuura

(10) Patent No.: US 6,511,007 B1
(45) Date of Patent: Jan. 28, 2003

(54) DOUBLE-BEARING TYPE REEL

(75) Inventor: Ken Matsuura, Hojo (JP)

(73) Assignee: Ken Matsuura Racing Service Co., Ltd., Hojo (JP)

( * ) Notice: Subject to any disclaimer, the term of this patent is extended or adjusted under 35 U.S.C. 154(b) by 63 days.

(21) Appl. No.: 09/692,163

(22) Filed: Oct. 20, 2000

(30) Foreign Application Priority Data

Nov. 17, 1999 (JP) ............................................ 11-326617

(51) Int. Cl.$^7$ ........................ A01K 89/02; A01K 89/033
(52) U.S. Cl. ........................ 242/290; 242/303; 242/320; 242/321
(58) Field of Search ................................ 242/290, 269, 242/320, 321, 303, 265, 267

(56) References Cited

U.S. PATENT DOCUMENTS

| | | | | |
|---|---|---|---|---|
| 3,499,609 A | * | 3/1970 | Policansky | .................. 242/269 |
| 5,328,012 A | * | 7/1994 | Takata | .......................... 192/45 |
| 5,411,218 A | * | 5/1995 | Uehara | ........................ 242/245 |
| 5,560,562 A | * | 10/1996 | Hartmann | .................... 242/255 |
| 5,720,371 A | * | 2/1998 | Kimura | ........................ 192/44 |
| 5,850,897 A | * | 12/1998 | Kimura | ....................... 192/3.3 |
| 6,298,966 B1 | * | 10/2001 | Mimura | ....................... 192/45 |

FOREIGN PATENT DOCUMENTS

| | | |
|---|---|---|
| JP | 62-38536 | 10/1987 |
| JP | 2835583 | 10/1998 |

* cited by examiner

Primary Examiner—John M. Jillions
(74) Attorney, Agent, or Firm—Armstrong, Westerman & Hattori, LLP

(57) ABSTRACT

The double-bearing type reel has a spool for winding up a fishing line and a drag mechanism 5 slipping to rotate the spool when a predetermined tension acts on the line wound round the spool. The drag mechanism comprises an outer ring, an inner shaft, a plurality of rollers arranged between the outer ring and the inner shaft so as to roll, and a torque adjusting section for moving the outer ring and the inner shaft relatively in an axial direction. The rollers are arranged between tapered roll surfaces which are an inner circumferential surface of the outer ring and an outer circumferential surface of the inner shaft and have center axes inclined against center axes of the outer ring and the inner shaft. The torque adjusting section adjusts slip torque of the outer ring and the inner shaft by pressing the outer ring and the inner shaft so as to move relatively in the axial direction, thereby the outer ring are slipped relatively by a tension exceeding a predetermined value acting on the line wound round the spool to rotate the spool and wind off the line. A circulation passage of lubricating oil is provided between the outer ring and the inner shaft passing through between the rollers and a plurality of through holes formed in the inner shaft. The outer ring has a radiating fin.

13 Claims, 24 Drawing Sheets

(PRIOR ART)

(PRIOR ART)

(PRIOR ART)

(PRIOR ART)

DOUBLE-BEARING TYPE REEL

BACKGROUND OF THE INVENTION

The present invention relates to a double-bearing type reel used mainly for fishing of large fishes such as marlin and the like.

The double-bearing type reel is designed so that a spool rotates idle when a tension exceeding a predetermined value acts on a fishing line wound round the spool. The reason is that the line should be prevented from breaking when the line is pulled strongly by a fish. Accordingly, the double-bearing type reel has a built-in drag mechanism. In a sense, the drag mechanism is a clutch mechanism for allowing rotation of the spool when a rotary torque exceeding a predetermined value acts on the spool.

In a most general construction as the drag mechanism of the double-bearing type reel, a friction ring is fixed to a side face of the spool or to a disk fixed to a rotary shaft of the spool. According to this construction, when the spool is moved in an axial direction, the friction ring is pressed against a brake shoe to adjust rotary torque for rotating the spool to be large.

Further, a double-bearing type reel having a built-in drag mechanism using a electromagnetic clutch has been developed as described in Japanese Utility Model Publication Sho 62-38536. As shown in FIG. 16, this double-bearing type reel has a disk 03 of electric conductive material rotated together with a spool 01 and a magnet 04 disposed near the disk 03. Accordingly, when the spool 01 is rotated, eddy current occurs in the disk 03 to produce a magnetic field. This magnetic field enlarges rotary torque of the disk 03, therefore functions as a brake. The drag mechanism of this construction has a characteristic that the eddy current becomes larger and the braking function becomes stronger as rotational speed of the spool is increased.

The drag mechanism having the friction ring pressed against the brake shoe as well as the drag mechanism of electromagnetic clutch type has a fault that tension acting on the line becomes large as the line wound round the spool becomes little, because even if the drag mechanism rotates the spool with a constant torque, the diameter of winding of the line becomes small and tension of the line becomes large as the line wound round the spool becomes little. For example, if the diameter of winding of the line becomes half, tension of the line must be twice in order to rotate the spool at the same torque, because rotary torque given to the spool by the line is in proportion to the product of the diameter of winding of the line and the tension of the line.

FIG. 24 shows the fact that reversal torque of a conventional double-bearing type reel having the friction ring fixed to a side face of the spool becomes large as the diameter of the winding of the line becomes small. FIG. 24 is a graph showing change of tension acting on the line when the line is paid out from the spool at a constant speed. The abscissa shows time, namely amount of pay out of the line. It is clear that tension of the line becomes large abruptly when the line is pulled out long and the diameter of winding becomes small as the time lapses.

This means that the line becomes apt to be broken as the line is paid out long and the diameter of winding on the spool becomes small. If the drag mechanism is adjusted to make the spool rotate easily for preventing the line paid out long from breaking, tension of the line becomes very small when the long line is wound round the spool to make the diameter of winding large, and the line is pulled out long by a fish unnecessarily. If the drag mechanism is adjusted so that the line is not pulled out long, tension of the line becomes large and the line is apt to be broken when the diameter of winding becomes small.

A cause of the above-mentioned evil is that the line is wound round the rotary spool. In a reel such as a spinning reel in which the spool is fixed and the line is wound round the spool using a rotary line roll, such an evil does not occur, because the tension of the line is determined by a radius of rotation of the line roll. The radius of rotation of the line roll is always constant regardless of the diameter of winding of the line wound round the spool. Therefore, in the spinning reel, tension of the line can be adjusted to constant regardless of the diameter of winding on the spool. However, the spinning reel can not be used for fishing of a large fish such as marlin and the like, because tension acting on the line is so strong that it is impossible to wind the line round the spool using the line roll reasonably.

In the double-bearing type reel, the spool is rotated to wind the line round the spool directly, therefore the double-bearing type reel can be used for fishing that a strong tension acts on the line. Since the double-bearing type reel is used for fishing of a large fish such as marlin and the like, the line is used in the very critical condition. Namely, the line is used in a condition that the line is apt to be broken very easily. Further, in the double-bearing type reel, a very long line of some hundreds meter is used in order to weaken the large fish enough. Therefore, the diameter of winding of the line wounded round the spool changes largely.

The double-bearing type reel is used in a very severe condition that the line pulled by the large fish is apt to be broken suddenly and tension of the line changes largely in accordance with the diameter of winding on the spool. Therefore, in trolling of the large fish, it is the true state that percentage of fish finally drawn up on the ship to fish caught on fishhooks is very low, below scores of percents. The most important characteristic required for the double-bearing type reel is how the fish caught on the fishhook can be recovered on the ship.

In order to solve such a difficult problem, the present applicant has been developed a double-bearing type reel as described in Japanese Patent No. 2835583. According to this double-bearing type reel, the construction is very simple, change of tension of the line caused by change of the diameter of winding of the line wound round the spool is little, and it is possible to draw and recover the large fish effectively.

As shown in FIGS. 17–20, this double-bearing type reel has a spool 01 for winding up a line, and a drag mechanism 05 slipping to rotate (reverse) the spool when a predetermined tension acts on the line wound round the spool 01.

The drag mechanism 05 has all of the following constitutions (a)–(e).

(a) The drag mechanism comprises an inner shaft 06, an outer ring 07, a plurality of rollers 08 arranged between the inner shaft 06 and the outer ring 07 so as to roll, and a torque adjusting section 09 for moving the inner shaft 06 and the outer ring 07 relatively in the axial direction.

(b) The outer ring 07 and the inner shaft 06 have tapered roll surfaces 010 for the rollers 08, and between the tapered roll surfaces 010 are arranged the rollers 08 so as to roll. The roll surface 010 has a taper angle of α (FIG. 21).

(c) The roller 08 disposed between the roll surfaces 010 is inclined against rotary axis of the outer ring 07 and the inner shaft 06. The inclination angle of the roller against the rotary axis of the outer ring 07 and the inner shaft 06 is set to β (FIG. 21).

(d) The torque adjusting section 09 presses the outer ring 07 and the inner shaft 06 to move them relatively in the axial direction. By the relative movement of the outer ring 07 and the inner shaft 06, slip torque between the outer ring 07 and the inner shaft 06 is adjusted so that when a tension exceeding a predetermined value acts on the line wound round the spool 01, the outer ring 07 and the inner shaft 06 slip to each other and the spool 01 rotates to pay out the wound line.

(e) The torque adjusting section 09 comprises a pressing ring 026 pressing the outer ring 07 in the axial direction through a thrust bearing 025, a ring spring 027 abutting against the pressing ring 026 to push it, a nut member 028 movable in the axial direction but retained by a side cover 017 so as not to rotate, a screw member 029 engaging with a female screw provided in a center of the nut member 028, and a handling member 030 for rotating the screw member from outside, so that in accordance with operation of the handling member 030, the thrust bearing 025 pushes the outer ring 07 in the axial direction (to the right in FIG. 19) through a transmission mechanism constituted by the above-mentioned members. Accordingly the outer ring 07 moves in the axial direction relatively to the inner shaft 06. The side cover 017 is fixed onto a side surface of a main body frame 014.

The double-bearing type reel is constructed so that when the line is paid out from the spool 01 to bring the drag mechanism 05 into a heated state, thermal expansion of the outer ring 07 becomes smaller than that of the inner shaft 06 or thermal expansion of the inner shaft 06 becomes larger than that of the outer ring 07, to reduce fluctuation of tension of the line. Thus, tension of the line paid out is controlled so as to be uniform.

In order to make deformations of the outer ring 07 and the inner shaft 06 owing to thermal expansion different from each other, the outer ring 07 and the inner shaft 06 are made of respective metals having different thermal expansions, or a radiating fin 032 is provided on the outer ring 07 to cool the outer ring 07 more than the inner shaft 06.

The spool 01 and the drag mechanism 05 are locally contacted with each other to reduce thermal conduction and connected to each other so as not rotate relatively. Namely, the spool 01 and the drag mechanism 05 are connected through steel balls 018 each disposed between a connecting grooves 022 formed on an outer circumferential surface of a connecting ring 019 integrally connected to the spool 01 and a corresponding connecting groove 022 formed on an inner circumferential surface of a connecting cylindrical portion 021 of the outer ring 07.

The drag mechanism 05 has seal rings for closing both ends of a gap formed between the roll surfaces 010 of the outer ring 07 and the inner shaft 06 to dispose the rollers 08. The seal rings 023 prevent sea water and foreign materials from entering into the gap between the roll surfaces 010.

Next, action of the double-bearing type reel will be described with reference to FIGS. 19 to 21.

The inner shaft 06 of the drag mechanism 05 is connected to a rotary shaft 012 which is rotated by a handle 011, and the outer ring 07 is connected to the spool 01. Rotary torque of the spool 01 is adjusted as follows.

The torque adjusting section 09 pushes the outer ring 07 in the axial direction as shown by the arrow A (to the right in FIG. 20, to the left in FIG. 21).

When the outer ring 07 is pushed in the direction shown by the arrow A, the outer ring 07 and the inner shaft 06 are pressed to each other so that the gap between the roll surfaces 010 of the outer ring 07 and the inner shaft 06 becomes narrow. Therefore, the roller 08 presses strongly against the roll surfaces 010. The roller 08 rolls on the roll surfaces 010 of the outer ring 07 and the inner shaft 06, but a part of a surface of the roller 08 slides along the roll surfaces 010, because the roll surfaces 010 are tapered and the center axis of the roller 08 is inclined against the center axis of the inner shaft 06 and the outer ring 07.

The roller 08 does not roll lightly since the roller 08 moves rubbing the roll surfaces 010 by a part of the surface of the roller 08. As the roller 08 is pressed against the roll surfaces 010 more strongly, a smooth rotation of the roller 08 along the roll surfaces 010 becomes more difficult. If the rotation of the roller 08 is difficult, the outer ring 07 shows a tendency to rotate together with the inner shaft 06 and a large rotary torque for rotating the outer ring 07 is required. The rotary shaft 012 rotated by the handle 011 is provided with an one-way clutch 013, so that the rotary shaft 012 can rotate only in one direction to wind up the line (direction of the arrow C). In this state, if a strong tension acts on the line wound round the spool 01, the outer ring 07 and the inner shaft 06 slip mutually to rotate the outer ring 07 in the direction of the arrow B, since the rotary shaft 012 does not rotate reversely. If the outer ring 07 does not slip with the inner shaft 06, the spool 01 does not rotate. Namely, a reverse rotary torque of the spool 01 can be adjusted by adjusting a rotary torque of slipping of the outer ring 07 to the inner shaft 06.

In FIG. 21, if the inner shaft 06 is fixed and the outer ring 07 is pushed in the direction shown by the arrow A and rotated in the direction shown by the arrow B, the inner shaft 06 rotates relatively to the outer ring 07 in the direction shown by the arrow C. At that time, the roller 08 eats into the gap between the tapered roll surfaces 010 and a large rotary torque is required to rotate the outer ring 07. As the outer ring 07 is pressed in the direction A more strongly, connection between the outer ring 07 and the inner shaft 06 becomes stronger and the rotary torque required to rotate the outer ring 07 relatively to the inner shaft 06 becomes larger. Namely, as a force applied to the outer ring 07 to press the outer ring 07 in the direction A becomes larger, the rotary torque of the outer ring 07 becomes larger. If the outer ring 07 and the inner shaft 06 are rotated relatively in directions opposite to the direction shown by the arrows B and C, the roller 08 does not eat into the gap between the roll surfaces 010 and the outer ring 07 can be rotated relatively to the inner shaft 06 lightly and freely. The drag mechanism 05 allows rotation of the outer ring 07 braking it when a predetermined reverse torque acts on the spool 01, therefore, the drag mechanism 05 is designed so that when the spool 01 is pulled by the line, the spool rotates in the direction shown by the arrow B in FIG. 21.

The rotary torque for rotating the outer ring 07 in the direction B with the inner shaft 06 fixed can be adjusted by the taper angle α of the roll surface 010 and the inclination angle β of the roller 08. In case that the taper angle a and the inclination angle β are too large or too small, eating of the roller 08 into the gap between the roll surfaces 010 is weak and the rotary torque is small. Therefore, the taper angle α and the inclination angle β are adjusted to optimum values taking a required rotary torque into consideration. For example, the taper angle α and the inclination angle β are set at about 15 degrees and about 20 degrees, respectively.

The reverse torque of the spool 01 (torque for rotating the spool 01 reversely) determines the maximum tension of the line. If the drag mechanism 05 is adjusted so that the spool 01 is allowed to rotate reversely with a low torque, the spool 01 rotates reversely to avoid a large tension acting on the line, because the spool 01 is rotated reversely by the tension of the line easily. To the contrary, if the reverse torque of the spool 01 is adjusted to be large by the drag mechanism 05, the spool is rotated reversely only when a large tension acts on the line, therefore the maximum tension of the line can be adjusted to be large.

In this drag mechanism 05, the reverse torque of the spool 01 is adjusted by a pressing force of the roller 08 against the roll surface 010. Namely, the reverse torque is a function of the pressing force of the roller 08 against the roll surface 010. The reverse torque can be kept in constant by keeping the pressing force of the roll 08 in constant. If the reverse torque of the spool 01 is kept in constant, as mentioned above, the maximum tension of the line changes in accordance with the diameter of winding of the line wound round the spool 01, because the torque required for rotating the spool 01 by the line is in proportion to the product of the tension of the line and the diameter of winding. If the diameter of winding of the line becomes small, the maximum tension of the line becomes large.

The construction of the double-bearing type reel is simple, and in this reel, the rotary torque of the spool 01 is adjusted by very skillful technique utilizing thermal expansions of the outer ring 07 and the inner shaft 06 effectively to reduce surely fluctuation of the maximum tension of the line corresponding to change of the diameter of winding of the line.

When a large tension acts on the line to pay out the line from the spool 01 and the diameter of wind becomes small, the outer ring 07 and the inner shaft 06 are heated because the roller 08 is pressed to the roll surface 010 and rolls in this state with a part of the surface of the roller 08 frictionally contacted with the roll surface 010. As the result, the outer ring 07 and the inner shaft 06 are subjected to thermal expansion. Since the diameter of the outer ring 07 is larger than that of the inner shaft 06, thermal expansion of the diameter of the roll surface 010 of the outer ring 07 is larger than that of the inner shaft 06. Therefore, as the outer ring 07 and the inner shaft 06 are heated, the gap between the roll surfaces 010 becomes wider, the force to press the roller 08 against the roll surface 010 becomes weaker and the reverse torque of the spool 01 becomes smaller. Namely, as the line is drawn out longer from the spool 01, the reverse torque of the spool 01 is adjusted to be smaller by heating of the outer ring 07 and the inner shaft 06. Namely, when the line is drawn out long and the diameter of winding on the spool 01 becomes small, the reverse torque of the spool 01 is adjusted to be weak, therefore, it can be prevented effectively that the maximum tension of the line becomes large abruptly.

Especially, in case that the outer ring 07 and the inner shaft 06 are made of the same kind of material, as shown in FIG. 22, the tension of the line becomes lower gradually as amount of pay out of the line increases and the diameter of winding on the spool becomes smaller, contrary to the case of the aforementioned customary double-bearing type reel having the friction ring fixed on a surface of the spool (see FIG. 24). This means that the reverse torque of the spool 01 is sufficiently corrected by thermal expansions of the outer ring 07 and the inner shaft 06. In this double bearing type reel, though abrupt change of the reverse torque of the spool 01 can be prevented utilizing thermal expansions of the outer ring 07 and the inner shaft 06, the reverse torque becomes somewhat small when amount of pay out of the line becomes large.

The reverse torque can be adjusted to an optimum value by reducing thermal expansion of the outer ring 07 and selecting materials for the outer ring 07 and the inner shaft 06. In order to reduce thermal expansion of the outer ring 07, the radiating fin 032 is provided on the outer ring 07 to cool the outer ring 07 forcibly, as shown in FIG. 19. The radiating fin 032 removes heat generated when the spool is rotated reversely by the line, from the outer ring 07 efficiently.

In addition, by using a material having a lower thermal expansion coefficient than that of the inner shaft 06 for the outer ring 07, lowering of the torque curve at the right side of FIG. 22 can be reduced. If thermal expansion of the outer ring 07 is smaller than that of the inner shaft 06, widening of the gap between the roll surfaces 010 can be reduced when the outer ring 07 and the inner shaft 06 are heated, similarly to the case that the outer ring 07 is cooled forcibly.

FIG. 23 shows a torque curve (tension curve of the line) of the double-bearing type reel having the inner shaft 06 made of SUS440C, the outer ring 07 made of ELMAX of the UDDEHOLM Co. with smaller expansion than that of the inner shaft 06, and the radiating fin 032 on the outer ring 07. As shown in FIG. 23, by selecting materials for the outer ring 07 and the inner shaft 06 so that thermal expansion of the outer ring 07 is smaller than that of the inner shaft 06 and further providing the radiating fin 032 on the outer ring 07 to cool the outer ring 07 forcibly, maximum tension of the line does not change abruptly even if the line is drawn out long and the diameter of winding becomes small, and the tension curve of the line can be made uniform almost ideally. Thermal expansion coefficients of materials used for the outer ring 07 and the inner shaft 06, and the area of the radiating fin 032 are properly selected and designed so that the tension curve becomes flat.

However, in the double-bearing type reel described in the aforementioned Japanese patent Publication No. 2835583, as shown in FIG. 23, when the line is drawn out long and the diameter of winding becomes small, tension of the line has a tendency to rise. That is, a tendency of the customary reel that tension of the line becomes maximum when the line is drawn long and the diameter of winding becomes very small, has not been dissolved even now. Further, instantaneous changes of the line tension in course of drawing out the line also cannot be ignored.

SUMMARY OF THE INVENTION

An object of the present invention is to solve the above-mentioned problems of the customary double-bearing type reel. According to the double-bearing type reel of the present invention, even if the same material is used for the outer ring and the inner shaft, by very simple construction, change of the line tension in accordance with change of the diameter of winding of the line owing to paying out of the line can be made uniform, instantaneous changes of the line tension can be made minute so that the line is not broken by a large fish, and the line does not drawn out unnecessarily by the large fish so that the large fish can be drawn near efficiently and recovered surely.

The present invention provides a double-bearing type reel having a spool for winding up a fishing line and a drag mechanism slipping to rotate the spool when a predetermined tension acts on the line wound round the spool; the drag mechanism comprising an outer ring, an inner shaft, a plurality of rollers arranged between the outer ring and the inner shaft so as to roll, and a torque adjusting section for moving the outer ring and the inner shaft relatively in an axial direction; the rollers being arranged between tapered roll surfaces which are an inner circumferential surface of the outer ring and an outer circumferential surface of the inner shaft, having center axes inclined against center axes of the outer ring and the inner shaft; the torque adjusting section adjusting slip torque of the outer ring and the inner shaft by pressing the outer ring and the inner shaft so as to move relatively in the axial direction, thereby the outer ring and the inner shaft being slipped relatively by a tension exceeding a predetermined value acting on the line wound round the spool to rotate the spool and wind off the line, wherein a circulation passage of lubricating oil is provided between the outer ring and the inner shaft passing through between the rollers.

According to this double-bearing type reel, even in heating condition of the drag mechanism when the line is drawn out from the spool, the rollers are pressed against the roll surfaces and the outer ring and the inner shaft are heated, lubricating oil circulates passing through between the outer ring and the inner shaft by pumping action owing to rotation and revolution of the rollers to cool the outer ring and the inner shaft uniformly and promote heat radiation from the outer surface of the outer ring. Accordingly, thermal expansions of the outer ring and the inner shaft are restrained, and especially thermal expansion of the outer ring is restrained even if the outer ring and the inner shaft are made of the same material. Therefore, when amount of pay out of the line becomes large and the diameter of winding of the line becomes small, lowering of the reverse torque of the spool and the tension acting on the line can be prevented effectively and fluctuation of the line tension can be made nearly uniform. Thus, the line is not broken by the large fish nor drawn out unnecessarily by the large fish, and the large fish can be drawn near effectively and recovered surely.

Compared with the double-bearing type reel of the prior art, instantaneous changes of the line tension can be made minute so that operation of the double-bearing type reel can be made smooth and endurance of the line can be improved. It is considered that the instantaneous changes of the line tension can be made minute because the outer ring and the inner shaft are cooled uniformly by circulation of the lubricating oil, therefore no axial and circumferential heat strain (unevenness) of the roll surfaces occurs, and the rollers roll smoothly. In addition, it is considered that the rollers roll smoothly because the roll surfaces are always supplied with the lubricating oil owing to circulation of the lubricating oil carried out forcibly by the pump action of the rollers so that a instantaneous oil exhaustion does not occurs.

The inner shaft may be formed with a plurality of through holes having both ends opened, extending in a direction of a center axis of the inner shaft and arranged circumferentially at regular intervals, so that the lubricating oil circulates through a space between the outer ring and the inner shaft and the through holes.

Since a circulation passage of the lubricating oil is formed, the aforementioned effects can be achieved surely. The double-bearing type reel can be made light by making the inner shaft light.

The outer ring may have a heat radiating fin for cooling the outer ring, thereby thermal expansion of the outer ring is restrained when the line is paid out from the spool and the drag mechanism is heated.

As the result, since the outer ring is more cooled by heat radiation from the fin, thermal expansion of the outer ring is more restrained when the line is paid out from the spool to heat the drag mechanism, to surely prevent excessive lowering of the reverse torque of the spool and tension acting on the line, so that fluctuation of the line tension can be made uniform.

The radiating fin may be formed by an annular or spiral thin plate having a plurality of cuts disposed in a lengthwise direction. As the result, since the cuts of the radiating fin stir the air when the outer ring rotates, cooling effect of the outer ring can be improved.

According to another aspect of the invention, there is provided a double-bearing type reel having a spool for winding up a fishing line and a drag mechanism slipping to rotate the spool when a predetermined tension acts on the line wound round the spool; the drag mechanism comprising an outer ring, an inner shaft, a plurality of rollers arranged between the outer ring and the inner shaft so as to roll, and a torque adjusting section for moving the outer ring and the inner shaft relatively in an axial direction; the rollers being arranged between tapered roll surfaces which are an inner circumferential surface of the outer ring and an outer circumferential surface of the inner shaft, having center axes inclined against center axes of the outer ring and the inner shaft; the torque adjusting section adjusting slip torque of the outer ring and the inner shaft by pressing the outer ring and the inner shaft so as to move relatively in the axial direction, thereby the outer ring and the inner shaft being slipped relatively by a tension exceeding a predetermined value acting on the line wound round the spool to rotate the spool and wind off the line, wherein parting means for parting the outer ring and the inner shaft from each other when the drag mechanism is released is provided.

This double-bearing type reel can be brought in a state of free spool surely when the drag is released, so that the line can be paid out without resistance surely in the state the drag is not applied. Therefore, a fishing mode that a float is floated left to the tide while baits are scattered can be carried out easily.

The outer ring may be connected to the spool through a connecting ring which rotates integrally with the outer ring and is movable relatively to the outer ring in an axial direction, and the parting means may include spring means for forcing the outer ring so as to part from the connecting ring.

The parting means can be incorporated in the drag mechanism utilizing a vacant space, so as not to obstruct forming the circulation passage of the lubricating oil, and with a reasonable layout. In addition, the construction can be simplified.

A plurality of connecting grooves may be formed on an outer circumferential surface of the connecting ring, a plurality of connecting grooves may be formed on an inner circumferential surface of a connecting cylindrical portion of the outer ring, a steel ball may be disposed between each corresponding connecting grooves of the connecting ring and the connecting cylindrical portion to connect the connecting ring and the connecting cylindrical portion so as to rotate integrally with each other, corresponding dent grooves may be formed on the outer circumferential surface of the connecting ring and the inner circumferential surface of the connecting cylindrical portion for receiving the spring means, and the corresponding dent grooves may be adjacent to the corresponding connecting grooves in a circumferential direction.

The means for connecting the outer ring and the connecting ring so as to rotate integrally with each other and to move in the axial direction relatively to each other (comprising the connecting grooves and the steel balls), and the parting means (comprising the dent grooves and the spring means) can be incorporated in the drag mechanism with a minimum space, so as not to obstruct forming the circulation passage of the lubricating oil, and with a reasonable layout. In addition, the construction can be simplified.

A casing may be fitted over the connecting ring and the outer ring.

The casing facilitates sealing up of the drag mechanism, prevents invading of sea water and foreign materials into the drag mechanism and contributes to improvement of endurance of the double-bearing type reel.

The casing may have a radiating fin for cooling the outer ring, thereby thermal expansion of the outer ring is restrained when the line is paid out from the spool and the drag mechanism is heated.

Since the outer ring is cooled through the casing by heat radiation from the radiating fin, thermal expansion of the outer ring is restrained when the line is paid out from the spool to heat the drag mechanism. Therefore, excessive lowering of the reverse torque of the spool at reduced diameter of winding of the line and excessive lowering of the tension acting on the line are prevented surely to make fluctuation of the line tension uniform.

According to further aspect of the invention, there is provided a double-bearing type reel having a spool for winding up a fishing line and a drag mechanism slipping to rotate the spool when a predetermined tension acts on the line wound round the spool; the drag mechanism comprising an outer ring, an inner shaft, a plurality of rollers arranged between the outer ring and the inner shaft so as to roll, and a torque adjusting section for moving the outer ring and the inner shaft relatively in an axial direction; the rollers being arranged between tapered roll surfaces which are an inner circumferential surface of the outer ring and an outer circumferential surface of the inner shaft, having center axes inclined against center axes of the outer ring and the inner shaft; the torque adjusting section adjusting slip torque of the outer ring and the inner shaft by pressing the outer ring and the inner shaft so as to move relatively in the axial direction, thereby the outer ring and the inner shaft being slipped relatively by a tension exceeding a predetermined value acting on the line wound round the spool to rotate the spool and wind off the line, wherein the torque adjusting section comprises a drag lever provided outside of a side cover; a screw member fixed to the drag lever penetrating the side cover so as to rotate relatively; a nut member provided inside of the side cover to engage with the screw member to be kept so as not to rotate; and transmission means for transmitting axial movement of the nut screw member to the outer ring through spring means, and the drag lever has a stopper means capable of once stopping rotation of the drag lever in a direction to rapidly increase slip torque of the outer ring and the inner shaft.

It is prevented that the drag lever is excessively rotated suddenly. Therefore, an impacting tension does not act on the line and breaking of the line can be prevented.

The stopper means may have a handling section positioned near a handling section of the drag lever, thereby the handling section of the stopper means can be operated concurrently with operation of the drag lever. As the result, operation of the stopper means becomes very easy.

The nut member may have a gear formed on an outer periphery, and an adjusting shaft member penetrating the side cover may have a tip end formed with a gear for engaging with the gear of the nut member, thereby drag load can be corrected by operating the adjusting shaft member from outside of the side caver to adjust axial position of the nut member.

By rotating the adjusting shaft member to correct a preset of the drag load for example, the drag load can be adjusted widely and finely.

DETAILED DESCRIPTION OF THE PREFERRED EMBODIMENT

Hereinafter, an embodiment of the present invention will be described with reference to the drawings.

Firstly, an outline of entire constitution of the double-bearing type reel according to the embodiment will be described based on FIGS. 1 to 5.

Figure 1:
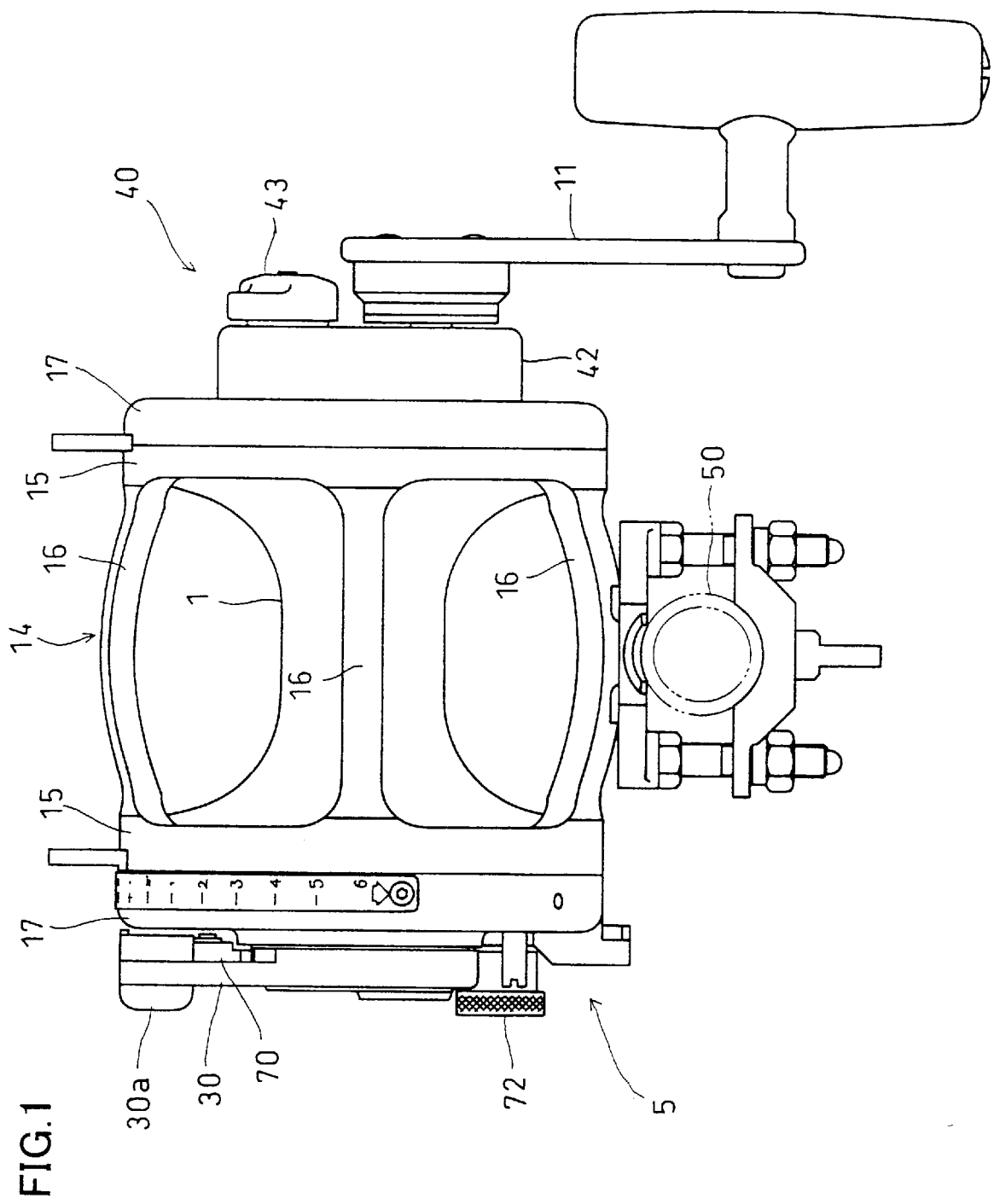
FIG. 1 is a front view of a double-bearing type reel according to an embodiment of the present invention.
Figure 2:
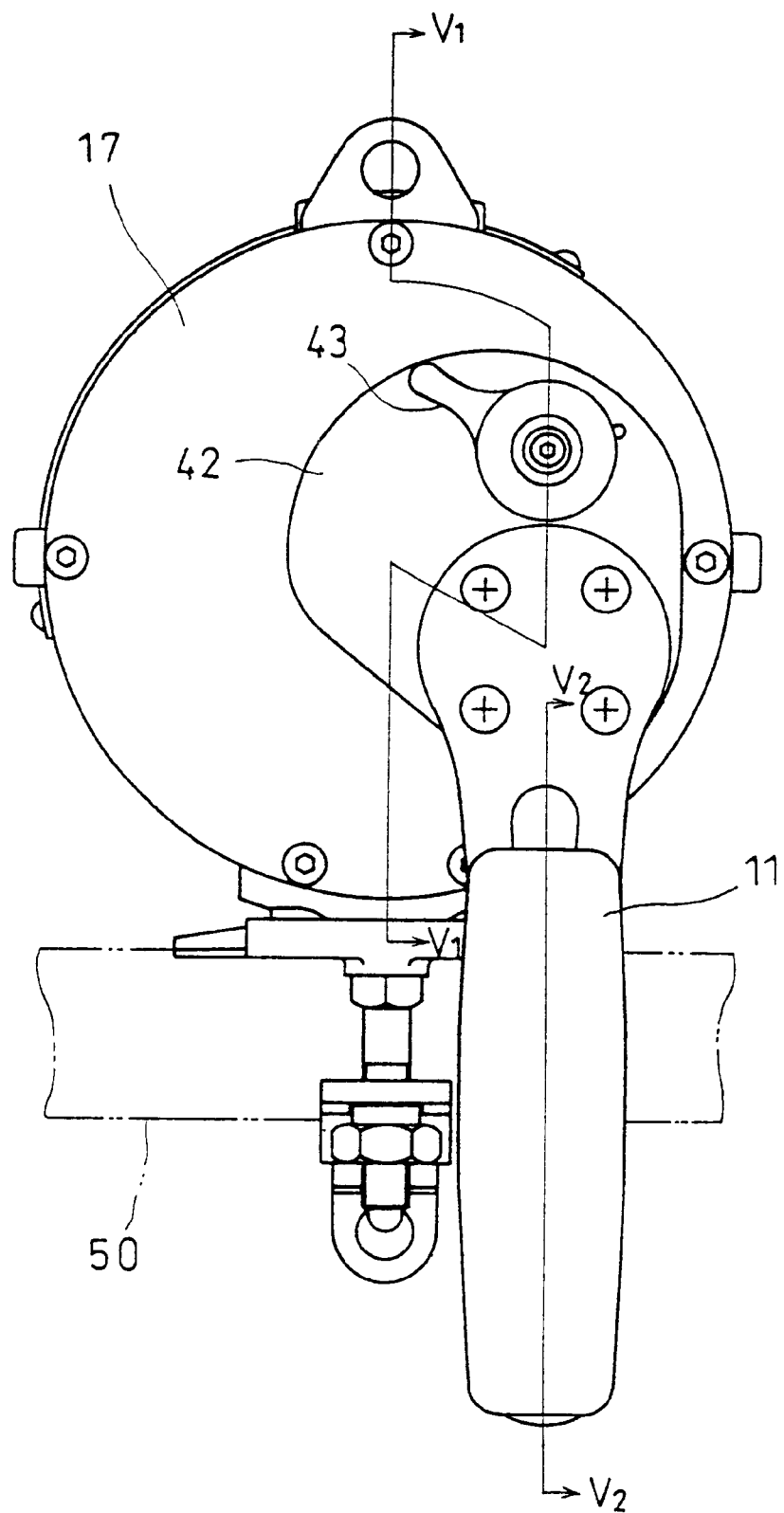
FIG. 2 is a right side view of FIG. 1.
Figure 3:
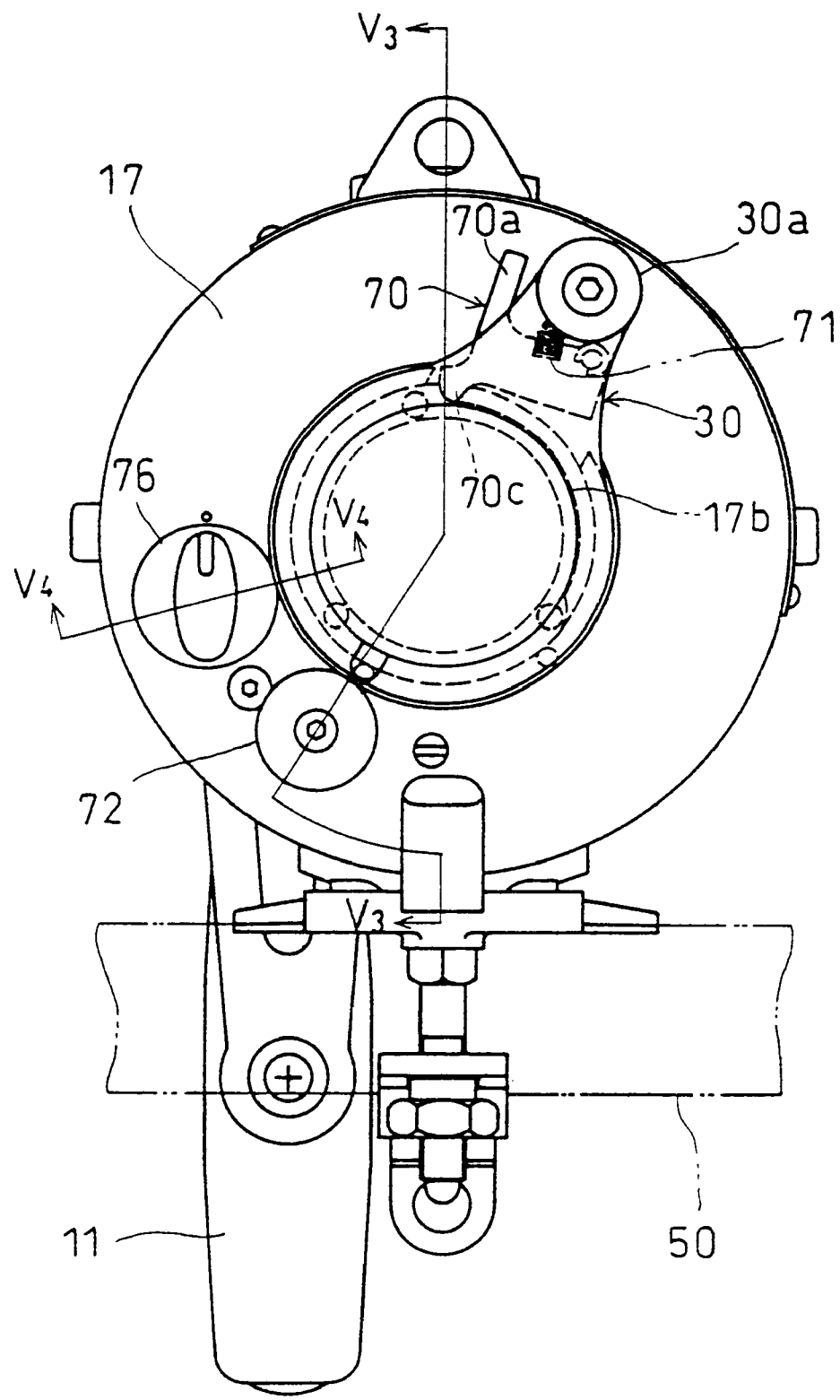
FIG. 3 is a left side view of FIG. 1.
Figure 4:
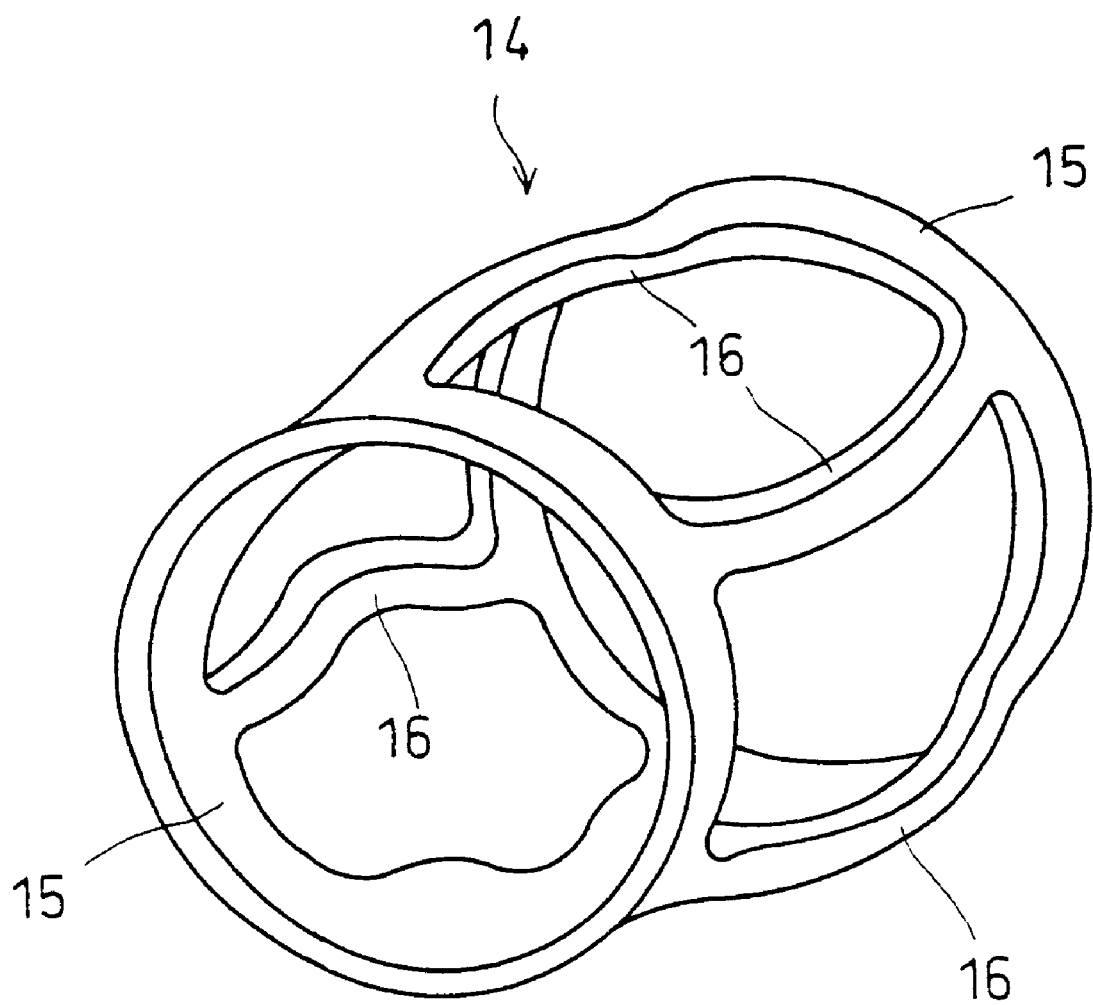
FIG. 4 is a perspective view of a main body frame of the double-bearing type reel of FIG. 1.
Figure 5:
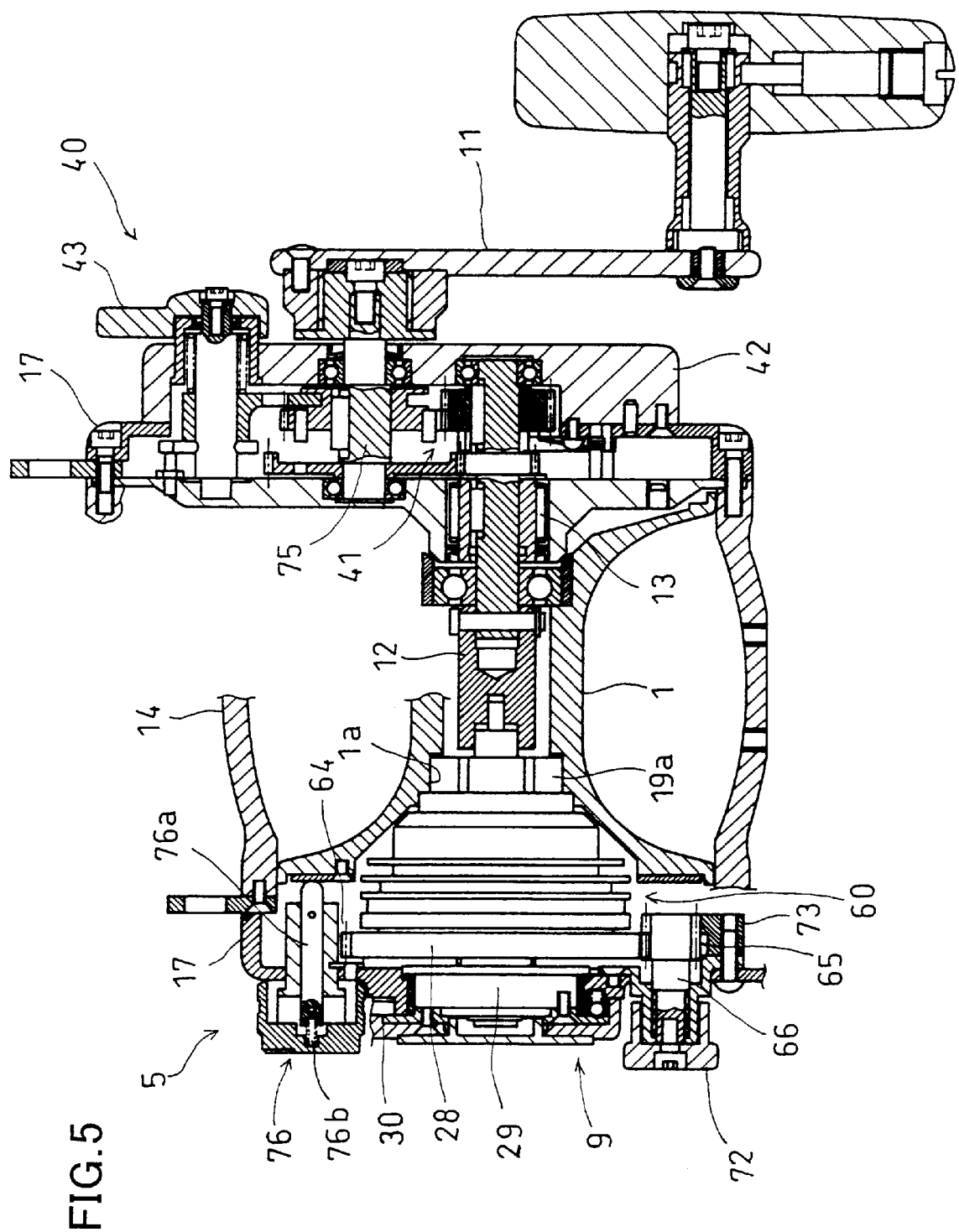
FIG. 5 is a synthetic view composed of partial sections taken along the lines V1—V1 and V2—V2 of FIG. 2, and partial sections taken along the lines V3—V3 and V4—V4 of FIG. 3.

FIG. 1 is a front view of the double-bearing type reel according to the embodiment, FIG. 2 is a right side view of FIG. 1, FIG. 3 is a left side view of FIG. 1, FIG. 4 is a perspective view of a main body frame of the double-bearing type reel of FIG. 1, and FIG. 5 is a synthetic view composed of partial sections taken along the lines V1—V1 and V2—V2 of FIG. 2 and partial sections taken along the lines V3—V3 and V4—V4 of FIG. 3.

The double-bearing type reel comprises a cylindrical main body frame 14 (FIG. 4) attached to a fishing rod 50, a spool 1 rotatably fitted inside of the main body frame 14 to wind up a fishing line (called as a line in the following), drive means 40 attached to a side of the main body frame 14 for rotating the spool, and a drag mechanism 5 attached to another side of the main body frame 14 for rotating the spool 1 in a direction to pay out the line when a predetermined tension acts on the line wound round the spool 1.

The drive means 40 and the drag mechanism 5 are attached to side surfaces of the main body frame 14 through respective side covers fixed to the side surfaces. In FIG. 1, within the right side cover 17 are incorporated a gear transmission mechanism and an one-way clutch 13 constituting the drive means 40 (FIG. 5), and within the left cover 17 are incorporated a slip torque forming section 60 constituting the drag mechanism 5 (FIG. 5).

As shown in FIGS. 1 and 5, the drive means 40 has a handle 11 for rotating a rotary shaft 12 having a tip end connected to the spool 1 through the drag mechanism 5. The one-way clutch 13 allows the rotary shaft 12 to rotate only in a direction to wind up the line round the spool 1. In the double-bearing type reel of this construction, the handle 11 rotates the rotary shaft 12, and rotation of the rotary shaft 12 is transmitted to the spool 1 through the drag mechanism 5. Therefore, the spool 1 can be rotated by rotating the handle 11. The drag mechanism 5 slips when a tension exceeding a predetermined value acts on the line to rotate the spool 1 reversely and pay out the line.

As shown in FIGS. 1 and 4, the main body frame 14 housing the spool 1 has ring-like side frames 15 positioned on both sides of the spool 1, and a plurality of connecting rods 16 connecting both side frames 15 extending over an outer periphery of the spool 1. The main body frame 14 is formed integrally of a metal such as aluminum, titanium or stainless steel. Alternatively, the side frames 15 and the connecting rods 16 may be made as each separated part and connected by welding, adhering or screwing to form the main body frame 14.

In the main body frame 14 shown in FIG. 4, the both side frames 15 are connected by four connecting rods 16. Among the four connecting rods 16, one positioned at the bottom is made wider because a fixing member for connecting the main body frame 14 to the fishing rod 50 is fitted to the connecting rod 16. Each of the four connecting rods 16 has a middle portion swelled outward so that an inner diameter of the main body frame 14 at a middle portion is larger than those at both sides. The side covers 17 are connected to the side frames 15 on both sides of the main body frame detachably or fixedly by means of screwing or the like.

As shown in FIGS. 1 and 5, the drive means 40 comprises the handle 11, a group of gears 41 for transmitting rotation of the handle 11 to the rotary shaft 12, and the one-way clutch 13 allowing the handle 11 to rotate only in a direction to wind up the line. The group of gears 41 and the one-way clutch 13 are housed in the side cover 17. The side cover 17 has a secondary side cover 42 covering the group of gears 41. In the double-bearing type reel of FIG. 5, the one-way clutch 13 is attached to the rotary shaft 12, but the one-way clutch 13 can be attached to any place as far as the rotary shaft 12 is rotated only in the direction to wind up the line.

Figure 8:
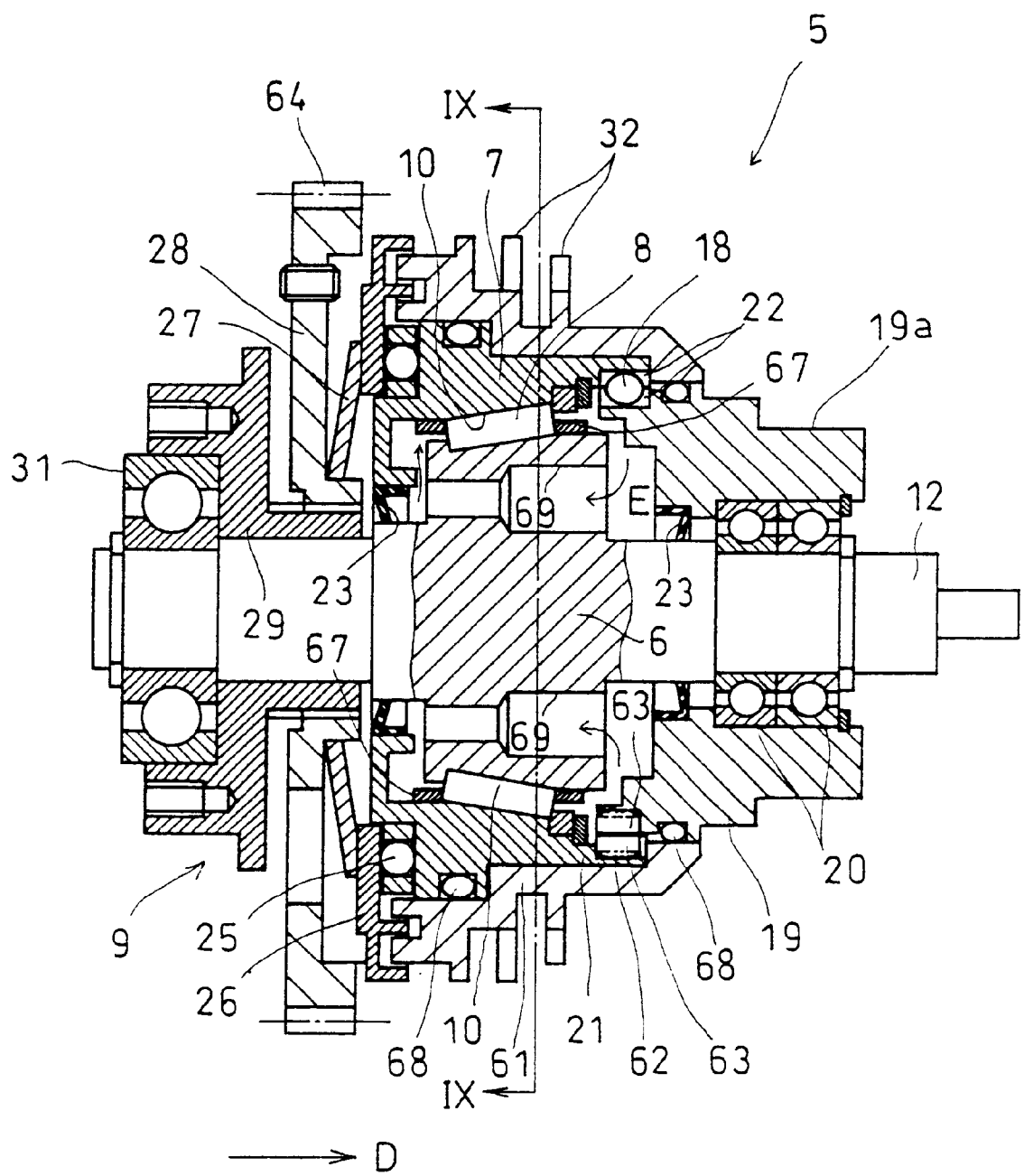
FIG. 8 is a vertical sectional view of a drag mechanism.

In the side cover 17 on the left side (in FIG. 1) of the main body frame 14, a slip torque forming section 60 of the drag mechanism 5 is incorporated as shown in FIGS. 5 and 8. The drag mechanism 5 has an inner shaft 6 connected to the rotary shaft 12, an outer ring 7 connected to the spool 1, a plurality of rollers 8 arranged between the inner shaft 6 and the outer ring 7 so as to roll, and a torque adjusting section 9 pressing the outer ring 7 in the axial direction.

Figure 19:
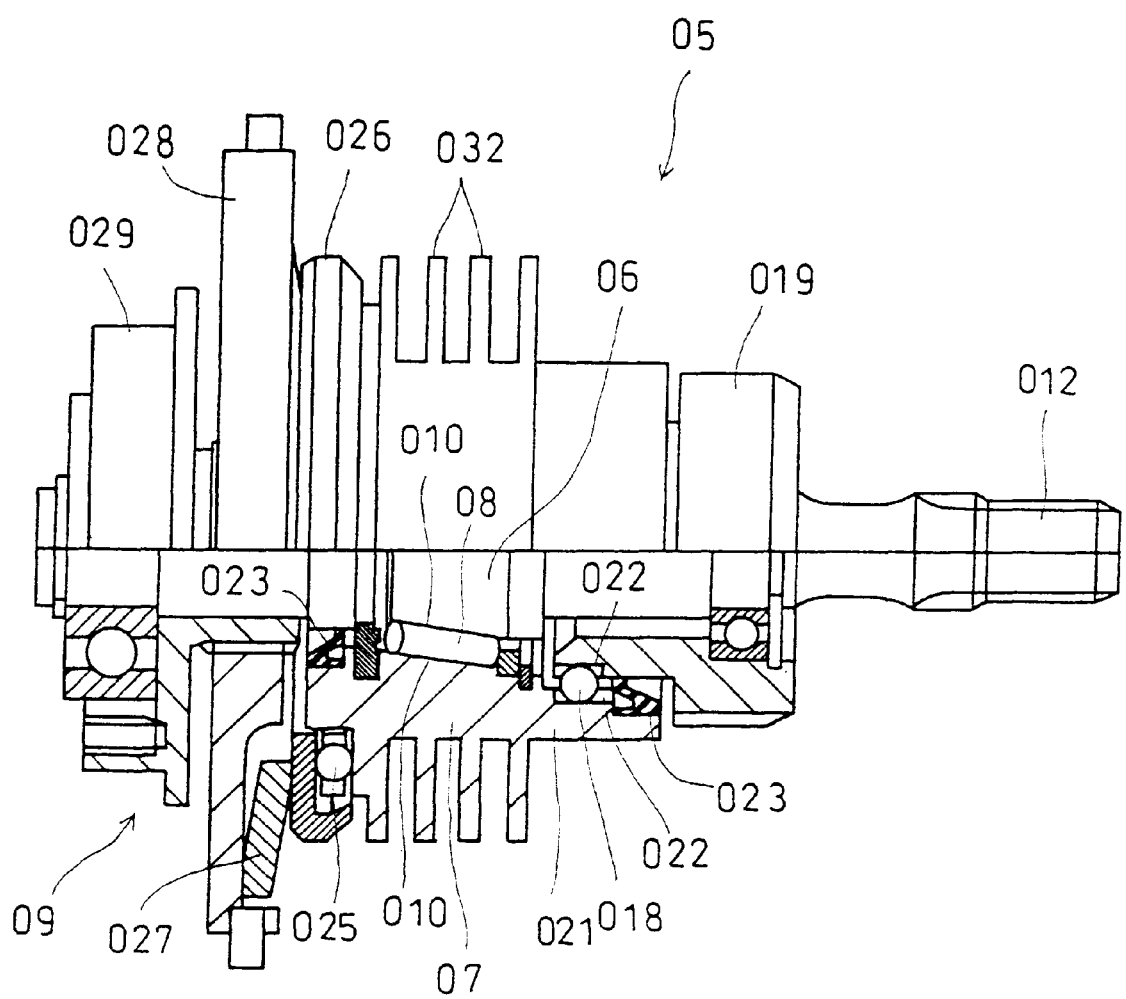
FIG. 19 is a vertical sectional view of a drag mechanism of the double-bearing type reel of FIG. 17.
Figure 20:
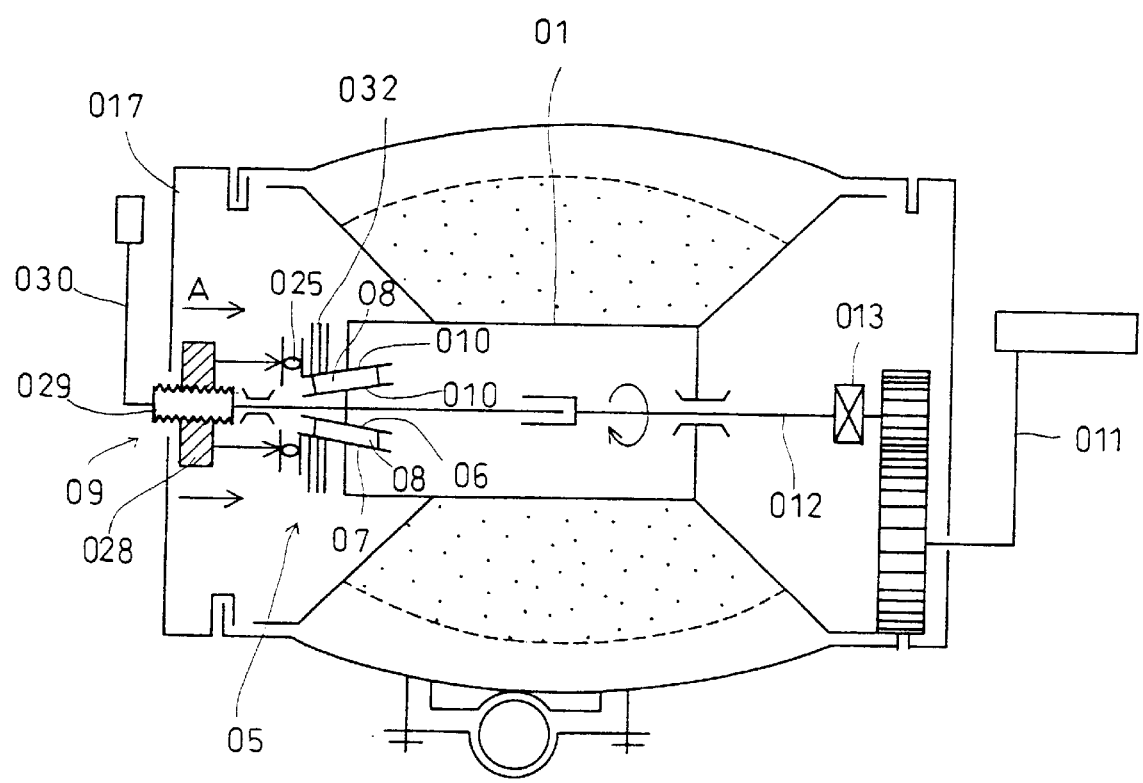
FIG. 20 is a schematic view showing a sectional construction of the double-bearing type reel of FIG. 17.
Figure 21:
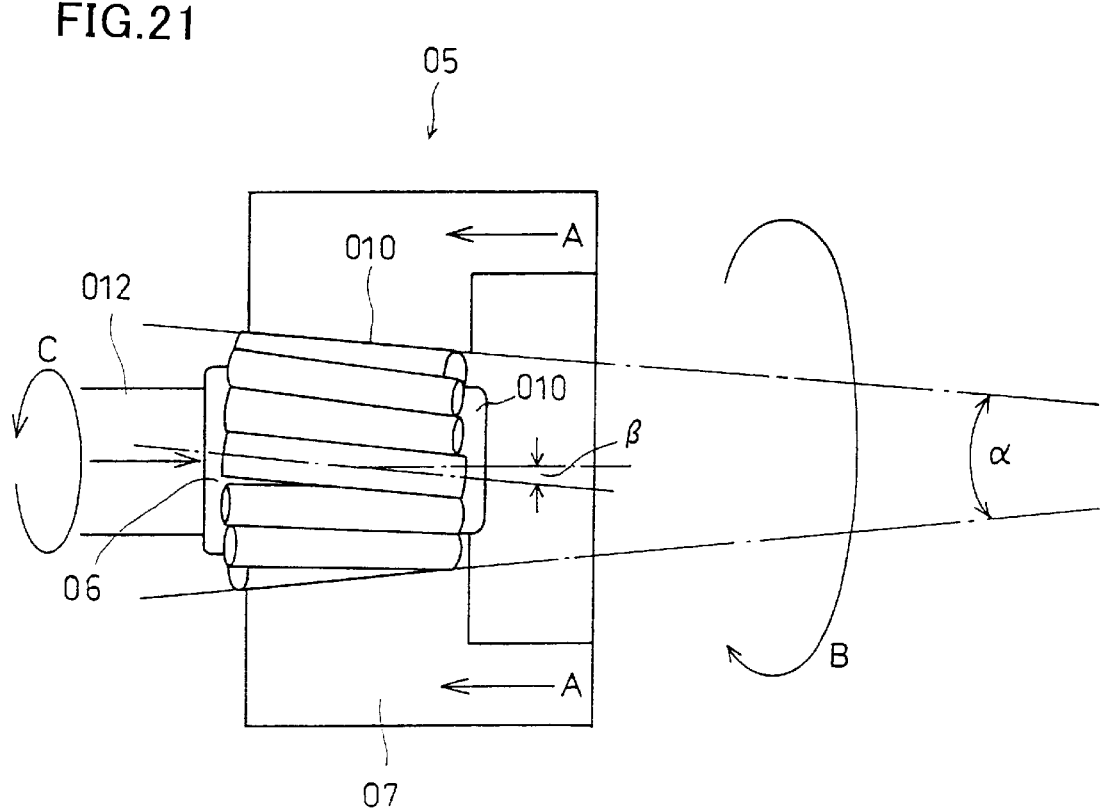
FIG. 21 is an illustration showing principle of operation of the drag mechanism.

The inner shaft 6 and the outer ring 7 have respective tapered roll surfaces 10 between which the rollers 8 are arranged so as to roll. An axial section of the roll surface 10 may be linear or somewhat curved. In order to arrange the rollers 8 at regular intervals between the roll surfaces 10, a retainer 67 similar to that of a normal bearing is disposed between the roll surfaces 10. The retainer 67 is made of metal or plastics, formed into a cylindrical shape and provided with slits for holding the rollers 8 rotatably. Further, the center axes of the rollers 8 are inclined against the axes of the outer ring 7 and the inner shaft 6. The mode of forming the roll surfaces and holding the rollers and operations thereof are the same as those in the prior art (see FIGS. 19, 21).

Figure 9:
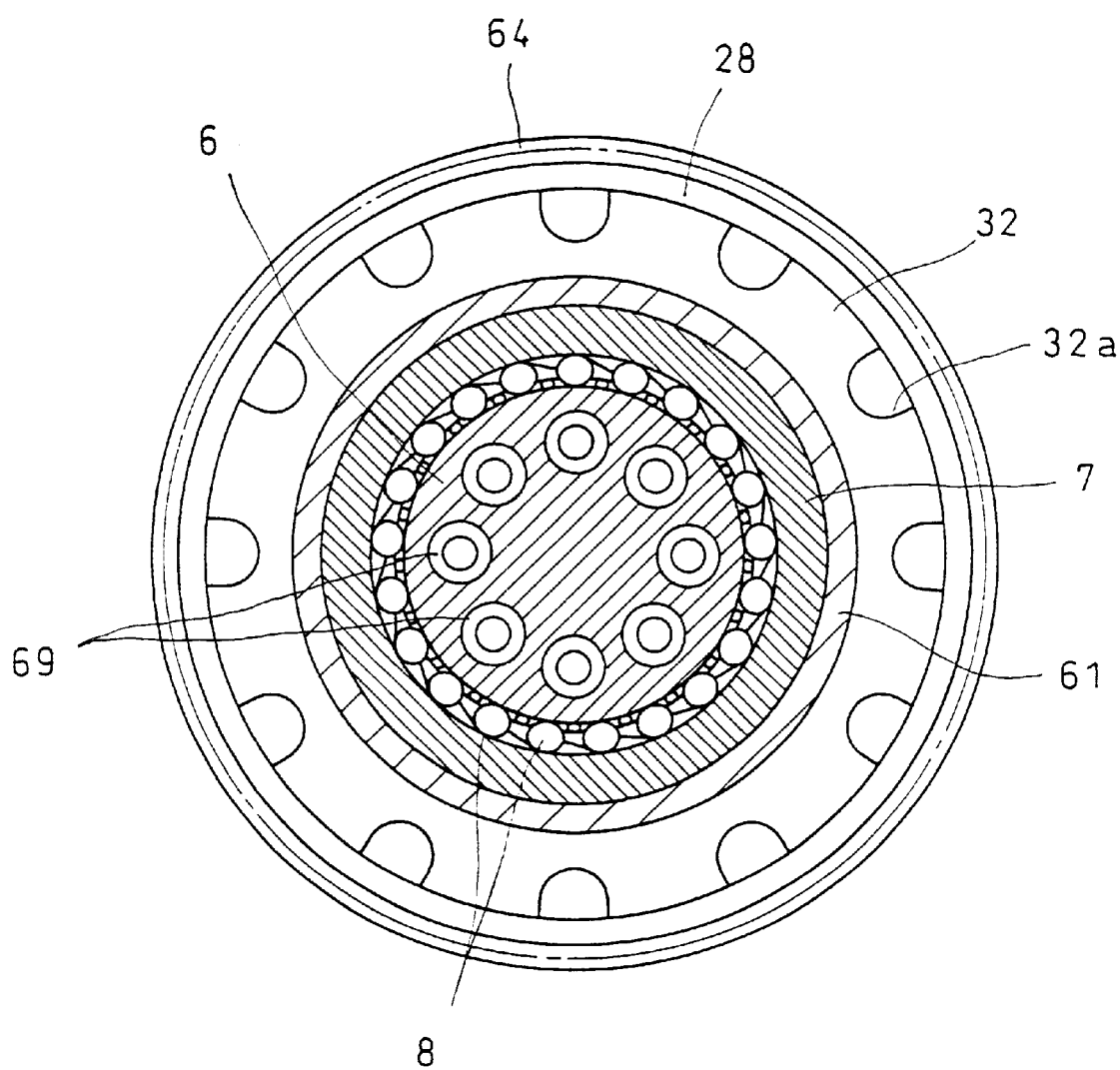
FIG. 9 is a sectional view taken along the line IX—IX of FIG. 8.
Figure 10:
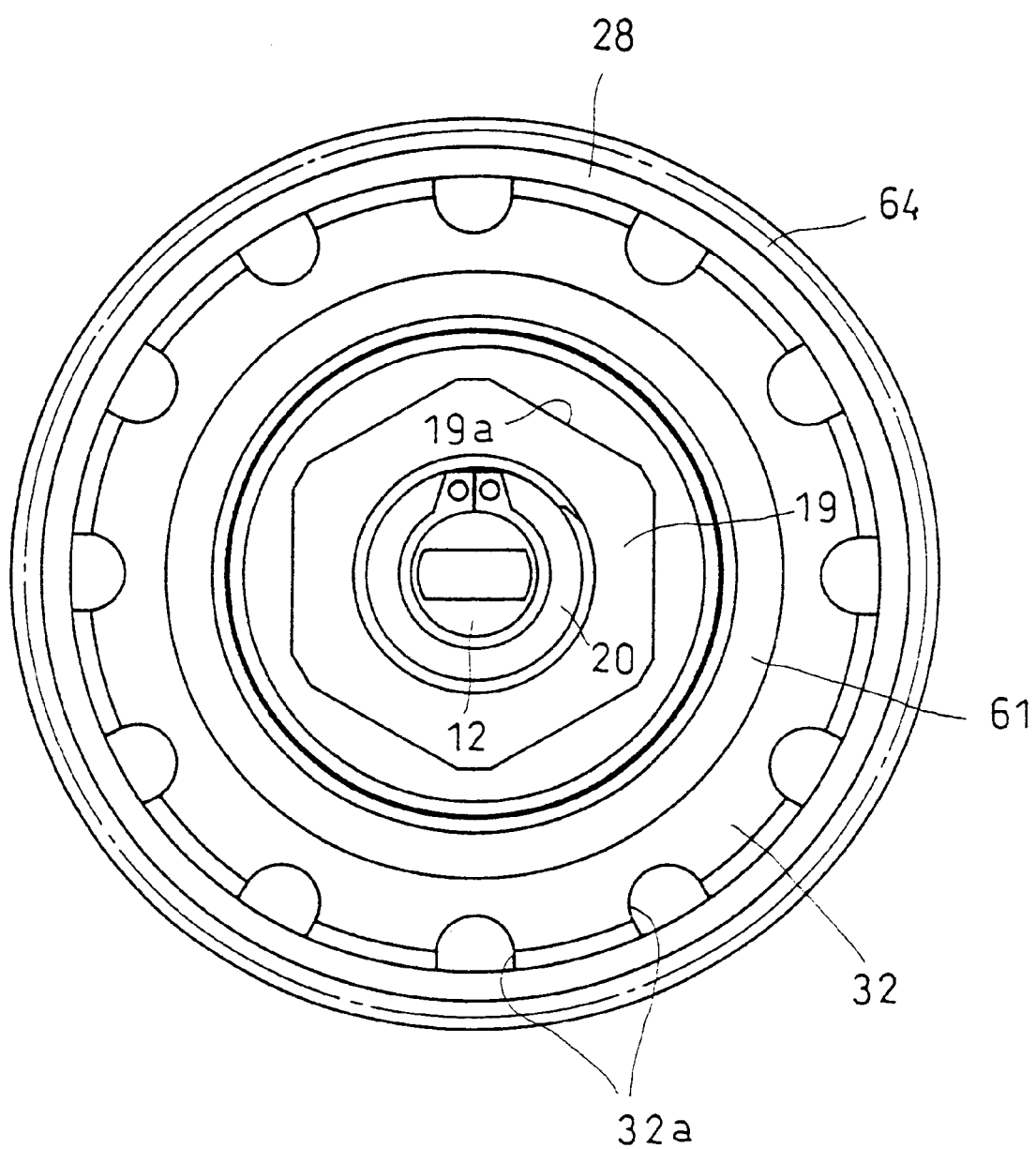
FIG. 10 is a right side view of FIG. 8.
Figure 11:
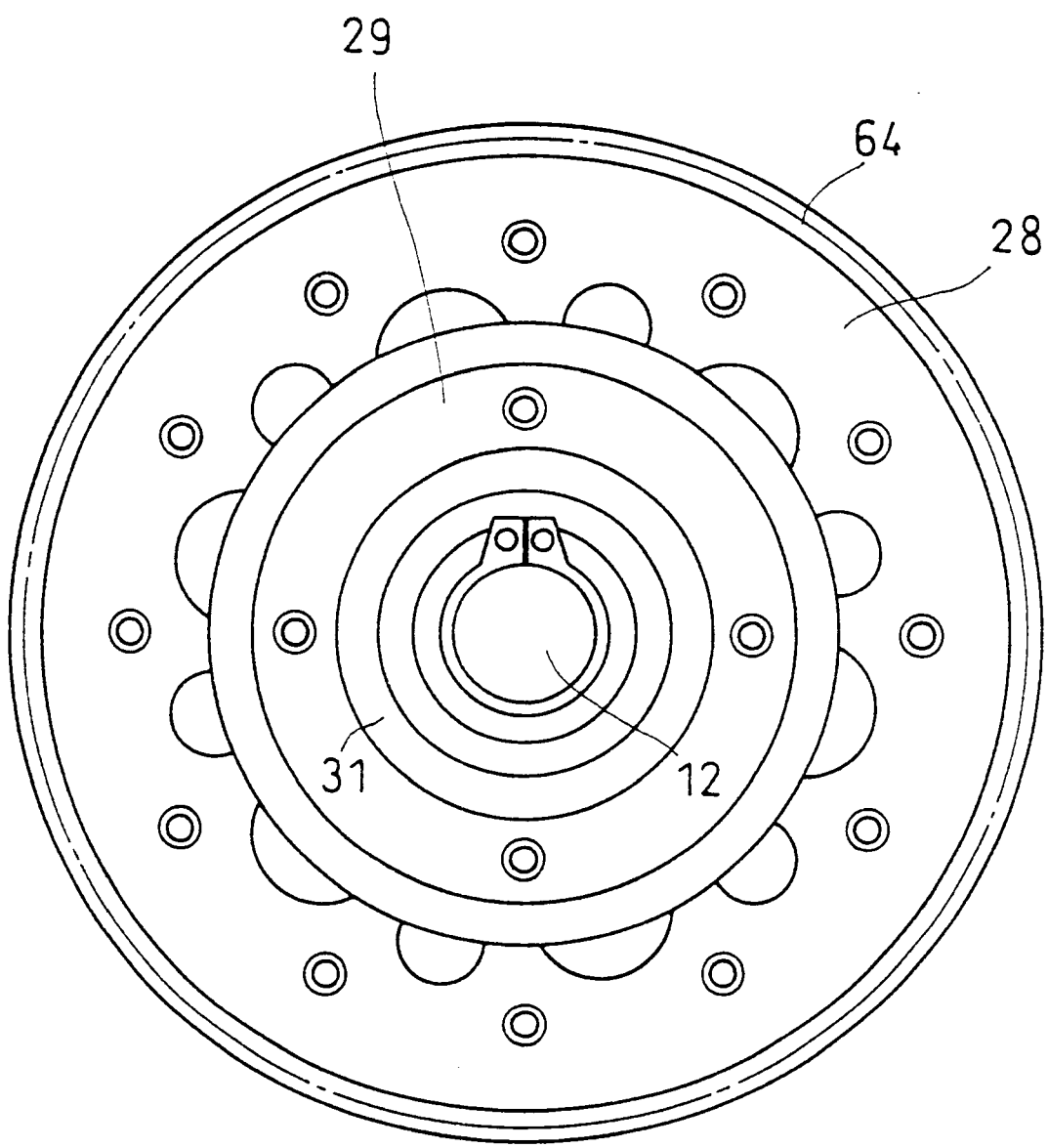
FIG. 11 is a left side view of FIG. 8.
Figure 12:
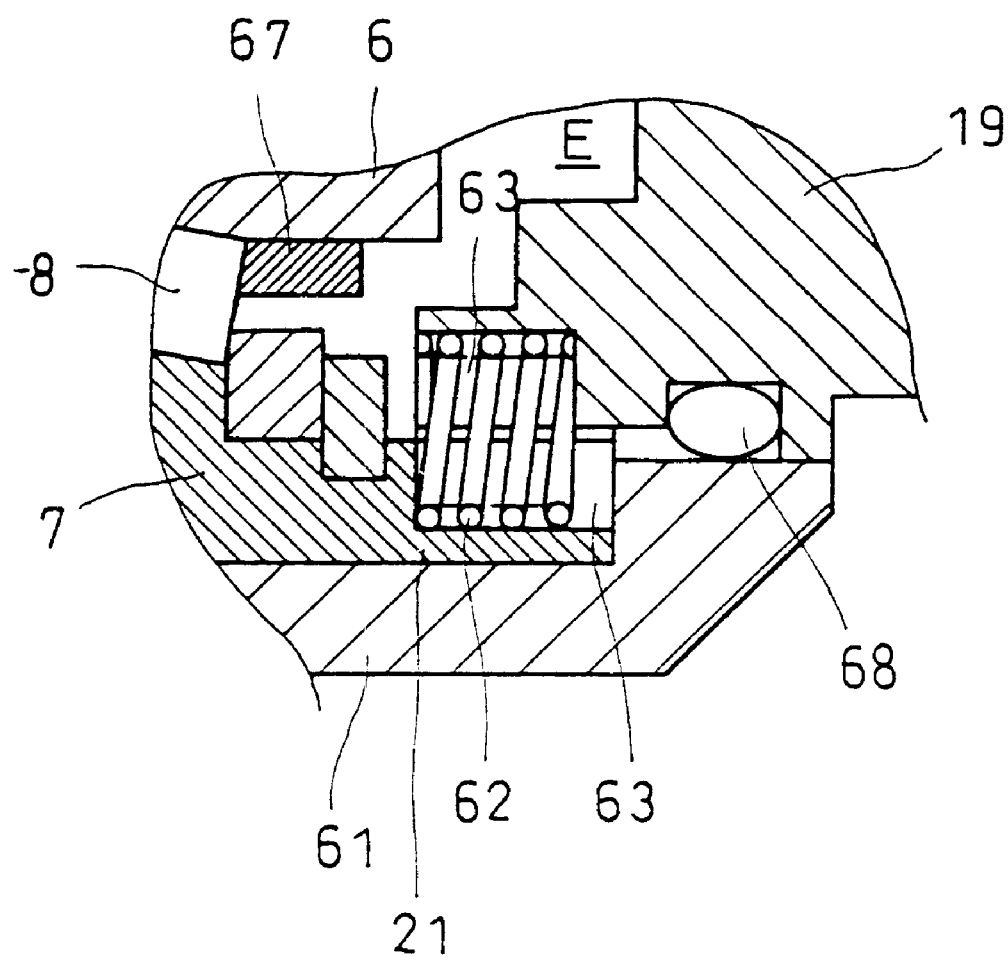
FIG. 12 is a partial enlarged view of FIG. 8.

The drag mechanism 5 is shown in FIGS. 8 to 12. FIG. 8 is a longitudinal sectional view of the drag mechanism 5, FIG. 9 is a sectional view taken along the line IX—IX of FIG. 8, FIG. 10 is a right side view of FIG. 8, FIG. 11 is a left side view of FIG. 8, and FIG. 12 is a partial enlarged view of FIG. 8.

As shown in FIG. 8, the drag mechanism 5 is constructed such that the inner shaft is made integral with the rotary shaft 12, and the outer ring 7 is connected to a connecting ring 19 through steel balls 18 so as not to rotate relatively to the connecting ring 19 (so as to rotate integrally with the connecting ring 19). In more detail, on an outer circumferential surface of the connecting ring 19 are formed axial connecting grooves 22, also on an inner circumferential surface of a connecting cylindrical portion 21 of the outer ring 7 on the right side (in FIG. 8) thereof are formed similar axial connecting grooves 22, and each of the connecting grooves 22 of the connecting ring 19 and corresponding each of the connecting grooves 22 of the connecting cylindrical portion 21 make a pair. The connecting ring 19 is inserted in the connecting cylindrical portion 21 with the steel balls 18 disposed between the each pair of the connecting grooves 22. Thus, the outer ring 7 and the connecting ring 19 are connected so as not to rotate relatively but to move in the axial direction.

The connecting ring 19 is pivotally supported on the rotary shaft 12 by means of two bearings 20. An end of the connecting ring 19 on the right side in FIG. 8 is formed in a hexagonal head section 19a (FIG. 10) for engaging with a hexagonal hollow of the spool 1 (FIG. 5). Thus, the outer ring 7 is connected to the spool. In order to obtain stable support of the connecting ring 19 to the rotary shaft 12, relatively small bearings 20 are used.

As shown in FIG. 12, between the neighboring pairs of connecting grooves 22 arranged circumferentially is disposed a pair of grooves 63 each formed on the outer circumferential surface of the connecting ring 19 and the inner circumferential surface of the connecting cylindrical portion 21 for housing a coil spring 62 which constitutes spring means for parting the outer ring 7 from the inner shaft 6 when the drag is released. Accordingly, when the drag is released, force of the roller 8 to press the roll surfaces 10 disappears and the spool 1 can be rotated freely.

On the outer surface of the outer ring 7 is fitted a casing 61 extending up to a left end portion (in FIG. 8) of the connecting ring 19. On an outer circumferential surface of the casing 61 are formed annular thin radiating fins 32 integrally. The radiating fin 32 has cuts 32a formed at several positions along the circumference of the fin. Since the air is stirred by the cuts 32a, radiating effect can be improved. The radiating fin 32 may be formed in a spiral.

Between an outer circumferential surface of the connecting ring 19 and an inner circumferential surface of the casing 61, and between an outer circumferential surface of the outer ring 7 and an inner circumferential surface of the casing 61, are inserted respective O-rings 68 for preventing lubricating oil supplied to rollers 8 from leaking. Also, between an inner circumferential surface of the connecting ring 19 and an outer circumferential surface of the rotary shaft 12, and between an inner circumferential surface of a left end portion (in FIG. 8) of the outer ring 7 and an outer circumferential surface of the rotary shaft 12, are inserted respective seal rings (V-packing) 23 for the same purpose. For the seal ring 23, an oil seal or an O-ring may be used in place of the V-packing.

Lubricating oil for lubricating the roll portion of the rollers 8 (portions participating rolling of the rollers 8) is housed in a lubricating oil housing chamber E surrounded by the outer ring 7, the casing 61, the connecting ring 19, the rotary shaft 12 and the inner shaft 6, sealed liquid-tight by the O-rings 68 and the seal rings 23. The lubricating oil circulates along a circulation passage formed passing through through holes 69 of the inner shaft 6 and between the rollers 8, owing to pumping action generated by rotation and revolution of the rollers 8. The through holes 69 are formed in the inner shaft 6 directed in the axial direction of the inner shaft 6 and spaced each other in the circumferential direction, and each has both ends opened. The lubricating oil carries away heat generated by frictional sliding of the rollers 8 and the roll surfaces 10 to promote radiating of the heat to the atmosphere through wall portions surrounding the housing chamber E, especially through the outer ring 7 and the radiating fin 32 of the casing 61. The roll portions of the rollers 8 are cooled uniformly in the axial direction and the circumferential direction by the above-mentioned circulation of the lubricating oil.

As shown in FIGS. 5 and 8, the torque adjusting section 9 for pushing the outer ring 7 in the axial direction comprises a push ring 26 for pushing the outer ring 7 in the axial direction through a thrust bearing 25, a ring spring 27 pushing the push ring 26, a nut member 28 adapted to be attached to the side cover 17 so as to move in the axial direction but not to rotate, a screw member 29 screwed in a female screw hole provided at the center of the nut member 28, and a drag lever (handling member) 30 fixedly connected to the screw member 29 for rotating the screw member 20 (see FIGS. 3 and 5). The drag lever 30 is provided outside of the side cover 17. The screw member 29 has a central hole engaging with the rotary shaft 12 and is inserted between an outer circumferential surface of the rotary shaft 12 and a central circular hole of the side cover 17 so as not to move in the axial direction but to rotate relatively to the rotary shaft 12 and the side cover 17. A bearing 31 is inserted between the screw member 29 and the rotary shaft 12.

Figure 13:
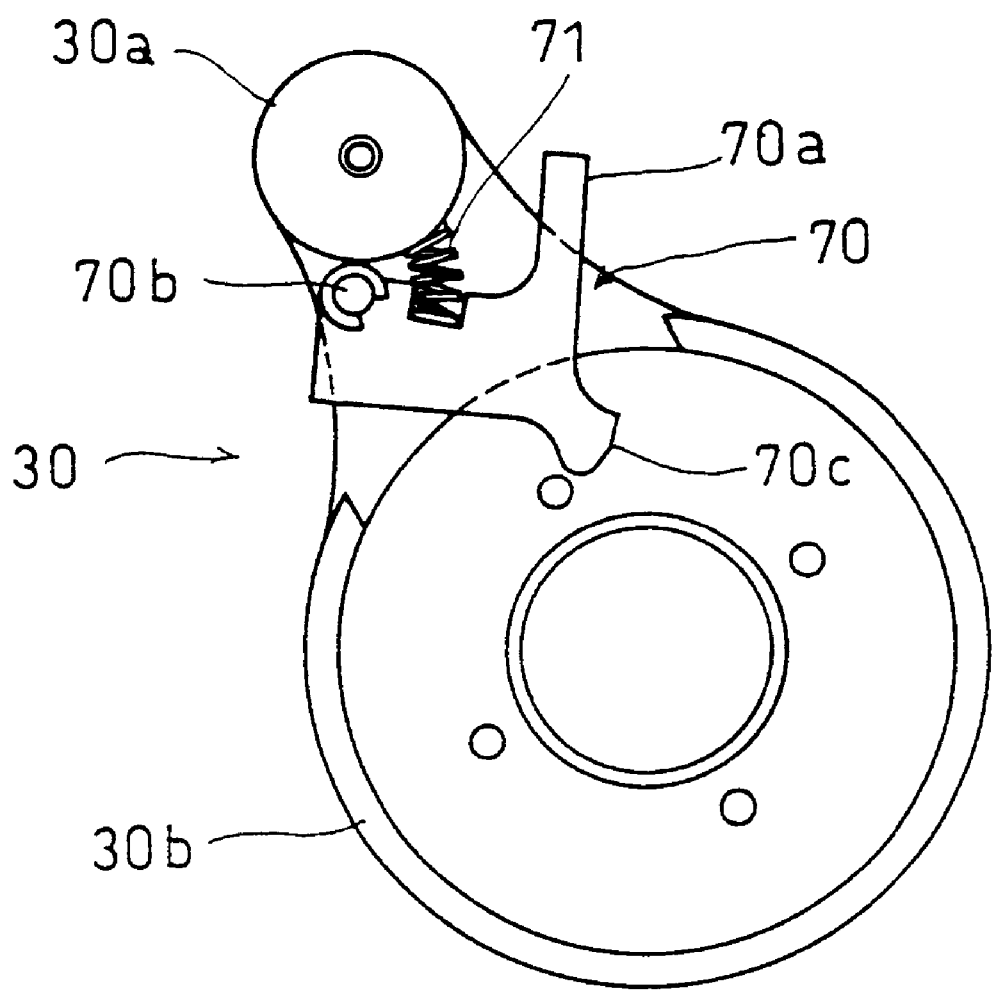
FIG. 13 is a back view of a drag lever.
Figure 14:
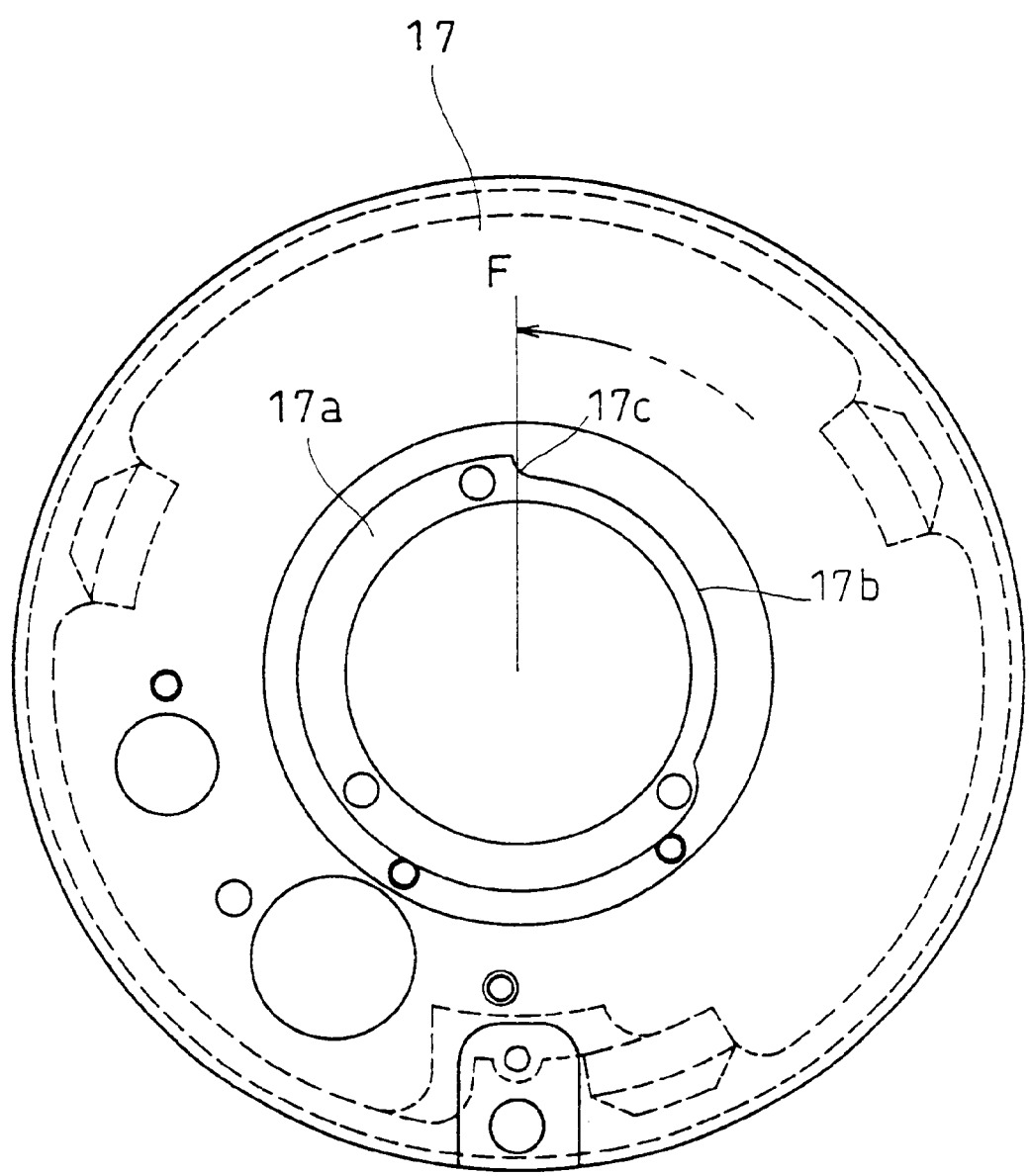
FIG. 14 is a view showing a drag mechanism side of a side cover.

The drag lever 30 has stopper means 70 capable of stopping once rotation of the drag lever 30 in a direction to abruptly increase slip torque of the outer ring 7 and the inner shaft 6 (see FIGS. 3 and 13). FIG. 13 shows the back side of the drag lever 30 and FIG. 14 is a front view of the side cover 17 from which the drag lever 30 is removed.

As shown in FIGS. 3 and 13, the stopper means 70 has a handling section 70a provided near a handling section (handling knob) 30a of the drag lever 30, so that the handling section 70a of the stopper means 70 can be handled concurrently with rotary handling of the drag lever 30.

When the drag lever 30 is fixedly connected to the screw member 29, an outer peripheral annular wall 30b of the drag lever 30 is just engaged with an inner peripheral annular wall 17a, so that the drag lever 30 can rotate guided by the inner peripheral annular wall 17a. When the drag lever 30 rotates, the screw member 29 is rotated and the nut member 28 is moved in the axial direction through screw engagement of the screw member 29 and the nut member 28.

The outer peripheral annular wall 30b of the drag lever 30 is partly cut at a region that the L-shaped stopper means 70 rotates about its support shaft 70b. The outer diameter of the inner peripheral annular wall 17a of the side cover 17 is partly reduced to form a cut portion 17b at a predetermined region before a rotational position F of the drag lever 30 where the slip torque of the outer ring 7 and the inner shaft 6 begins to increase abruptly by rotation of the drag lever 30.

When the drag lever 30 rotates guided by the inner peripheral annular wall 17a of the side cover 17, a tip end 70c of the stopper means 70 opposite to the handling section 70a can be moved sliding on the surface of the cut portion 17b of the inner peripheral annular wall 17a. And when the drag lever 30 reaches the rotational position F, the tip end 70c collides with a barrier 17c at the rotational position F. Thus, rotation of the drag lever 30 in a direction that the slop torque of the outer ring 7 and the inner shaft 6 increases abruptly is stopped at once.

When it is required to further increase the slip torque of the outer ring 7 and the inner shaft 6, the operator's finger holding the handling section 30a of the drag lever 30 is put on the handling section 70a of the stopper means 70 to rotate the stopper means 70 counterclockwise in FIG. 13 (clockwise in FIG. 3) against force of the spring 71. Therefore, the tip end 70c can climb over the barrier 17c and the drag lever 30 can be further rotated over the rotational position F.

When the drag lever 30 is rotated, the nut member retained to the side cover so as not to rotate is moved in the axial direction by engagement with the screw member 29 and pushes the ring spring 27 to energize it. However, the retaining position of the nut member 28 to the side cover 17 can be adjusted by rotating the adjusting shaft member 66 from outside of the side cover 17, thus an initial set value of drag load can be corrected.

Figure 6:
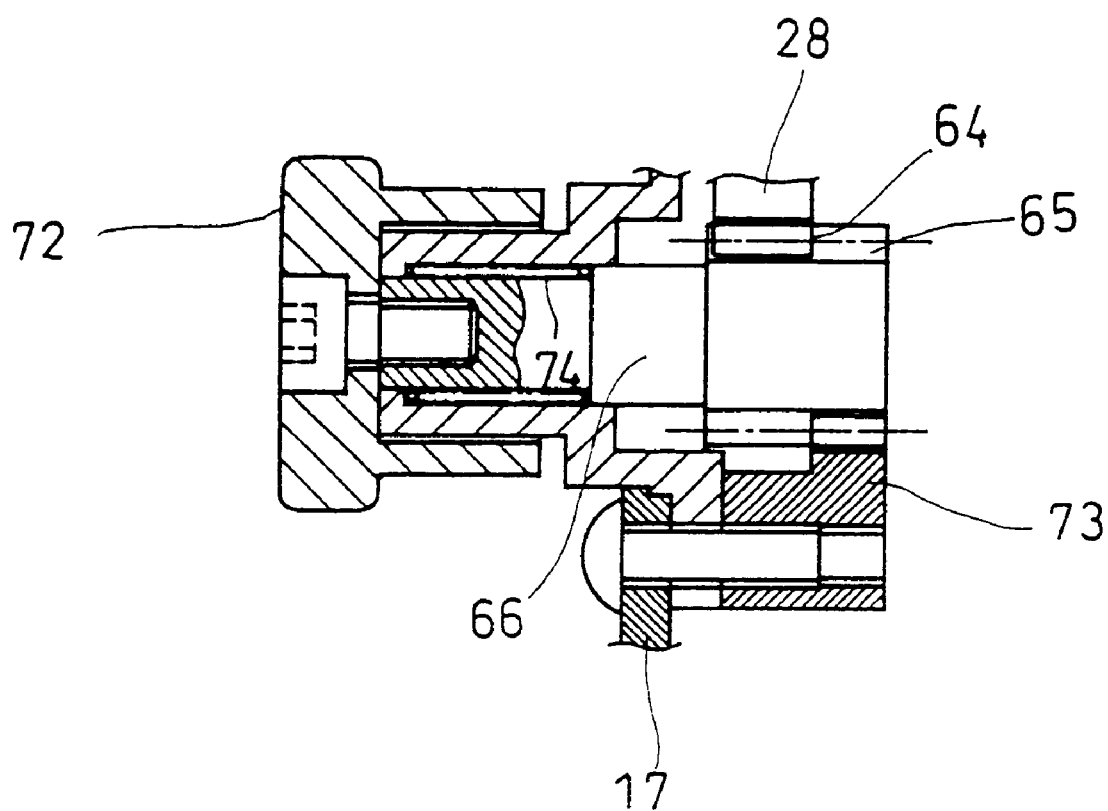
FIG. 6 is a partial enlarged view of FIG. 5.

For this purpose, a gear 64 is formed on outer periphery of the nut member 28, and the adjusting shaft member 66 having a gear 65 on the tip end for engaging with the gear 64 is attached penetrating the side cover 17. As shown in FIG. 6 better, normally, the gear 65 of the adjusting shaft member 66 is also engaged with a stopper gear 73 attached to the side cover 17 to make the adjusting shaft member 66 stationary. In this state, if the adjusting shaft member 66 is pulled out against a spring 74 by means of a knob 72 on an outer end of the adjusting shaft member 66, the gear 65 of the adjusting shaft member 66 is disengaged with the stopper gear 64. At that time, the gear 65 of the adjusting shaft member 66 is engaged with only the gear 64 of the nut member 64. Therefore, in that state, if the adjusting shaft member 66 is rotated by a required amount by means of the knob 72 of the adjusting shaft member 66, the nut member 28 is rotated by a required amount so that position of the nut member 28 in the axial direction can be adjusted. If the knob 72 of the adjusting shaft member 66 is released, the gear 65 of the adjusting shaft member 66 is forced into the stopper gear 73 by the spring means 74 to engage with the stopper gear 73, and the adjusting shaft member 66 returns to the normal state.

The handle 11 of the driving means 40 is fitted to a male screw 75a (FIG. 7) formed on an outer end of the input shaft 75 by screw engagement. This screw engagement is tightened when the handle 11 is rotated in a direction to wind up the line round the spool 1. When the handle 11 is rotated contrary to the above direction, the rotary shaft 12 does not rotate in the direction owing to working of the one-way clutch 13, therefore the screw engagement is loosened. Accordingly, it is easy to detach the handle 11 or replace the handle with another one having a reach fitting a player, and the entire apparatus can be made compact when the reel is not used because of storage, transportation or the like.

Figure 7:
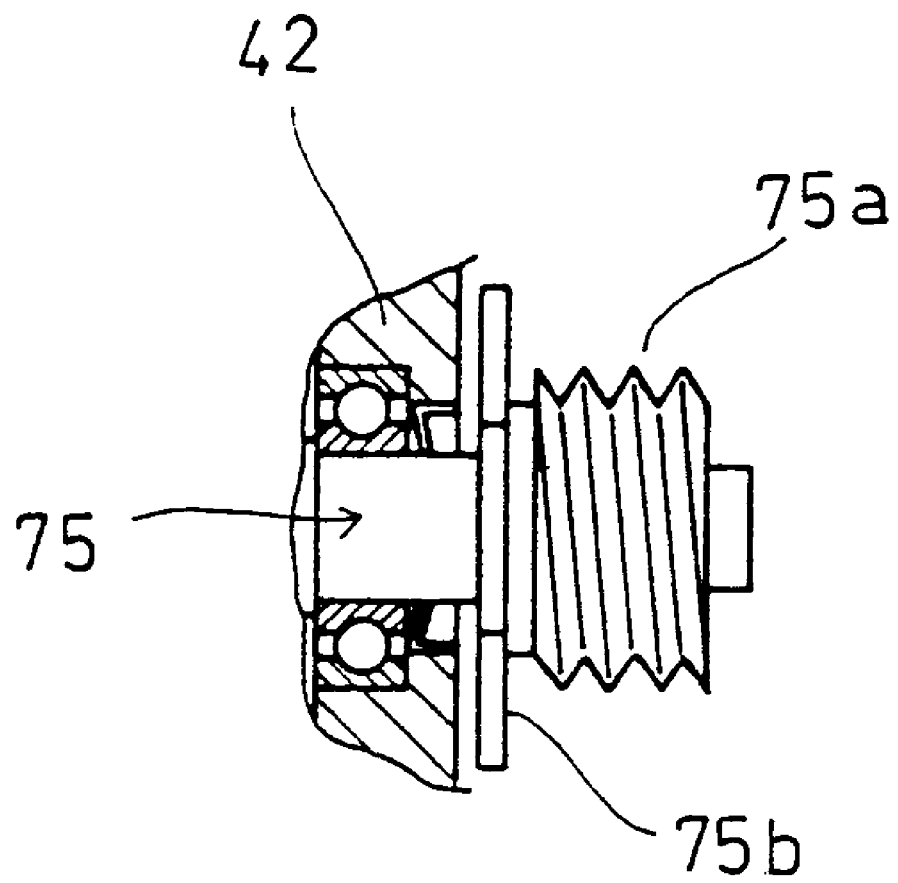
FIG. 7 is a detailed view of a male screw portion of an input shaft of a handle attachment section.

The pitch of the male screw 75a of the input shaft 75 is relatively large as shown in FIG. 7. Therefore, it is prevented that a female screw of the handle 11 is tightened onto the male screw 75a excessively. The screw grooves of the screw having large pitch can be filled with a sufficient amount of grease for easy attachment and detachment of the handle.

Both the female screw of the handle 11 and the male screw 75a of the input shaft 75 are made of SUS material. However, in such a case, the screws are liable to be seized. Therefore, each of the screws is coated with a solid film lubricant. Since the male screw 75a of the input shaft 75 is provided with a seat face 75b coming into surface contact with the female screw of the handle 11 to fix it, excessive eating of the female screw into the male screw 75a is prevented. Also the seat face 75b is coated with the solid film lubricant similarly to the screws.

The handle 11 may be connected to the input shaft by a serration engagement in place of the screw engagement. In case of the serration engagement, the cost is somewhat disadvantageous but attaching and detaching work of the handle 11 can be carried out more easily.

As for the one-way clutch 13, an one-way clutch having little backlash is used. Therefore, even at a moment that a fish hits and the line is paid out, no shock acts on the line.

The torque adjusting section 9 acts as follows to adjust pressing force applied to the outer ring 7 axially.

(1) The drag lever 30 is rotated by handling it from the exterior and the screw member 29 connected to the drag lever is rotated.

(2) The nut member 28 engaged with the screw member 29 moves axially.

(3) Force of the ring spring 27 pressing the push ring 29 is changed. When the nut member 27 moves to the right in FIG. 8, the ring spring 27 presses the push ring 26 more strongly.

(4) The outer ring 7 is pushed through the thrust bearing 25 in the direction shown by the arrow D strongly.

(5) Rotary torque of the outer ring 7 to the inner shaft 6 becomes large. Namely, reverse torque necessary for the line to rotate the spool 1 is adjusted to be large.

As mentioned above, in the drag mechanism 5 shown in FIG. 8, the reverse torque with which the spool 1 is rotated reversely by the line can be adjusted by moving the ring spring 27 axially with the drag lever 30. In the drag mechanism 5, the inner shaft 6 is connected to the rotary shaft 12 and the outer ring 7 is connected to the spool 1, but the double-bearing type reel of the present invention can be modified so that the inner shaft is connected to the spool and the outer ring is connected to the rotary shaft.

Figure 22:
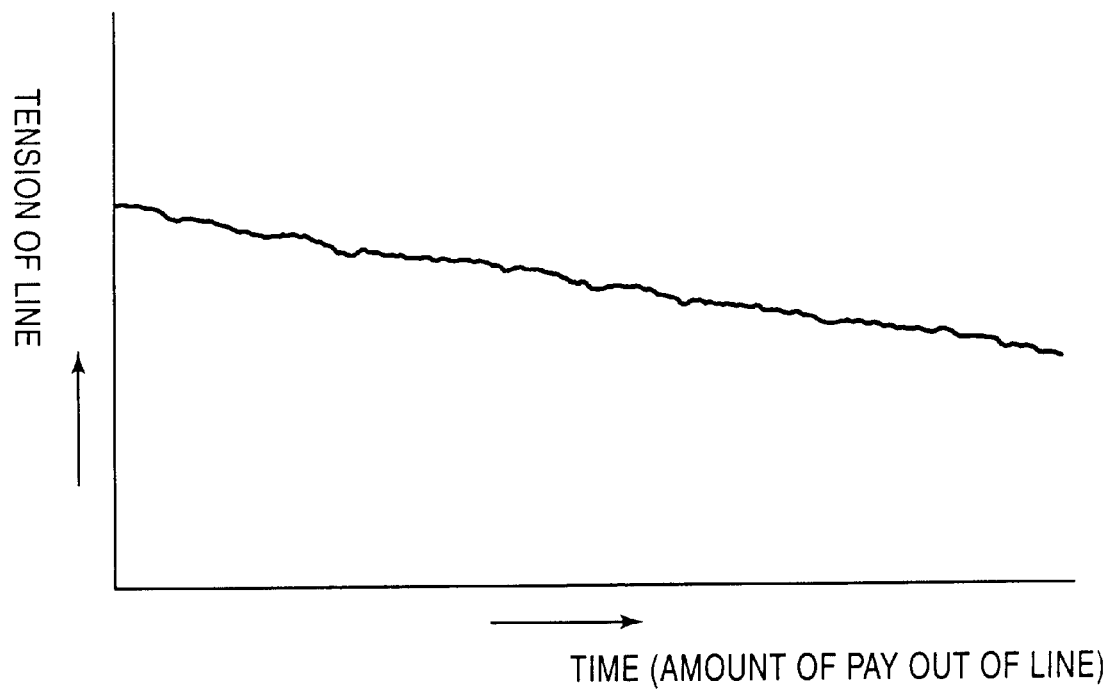
FIG. 22 is a graph showing relation between amount of pay out of the line and tension of the line in a customary double-bearing type reel.
Figure 24:
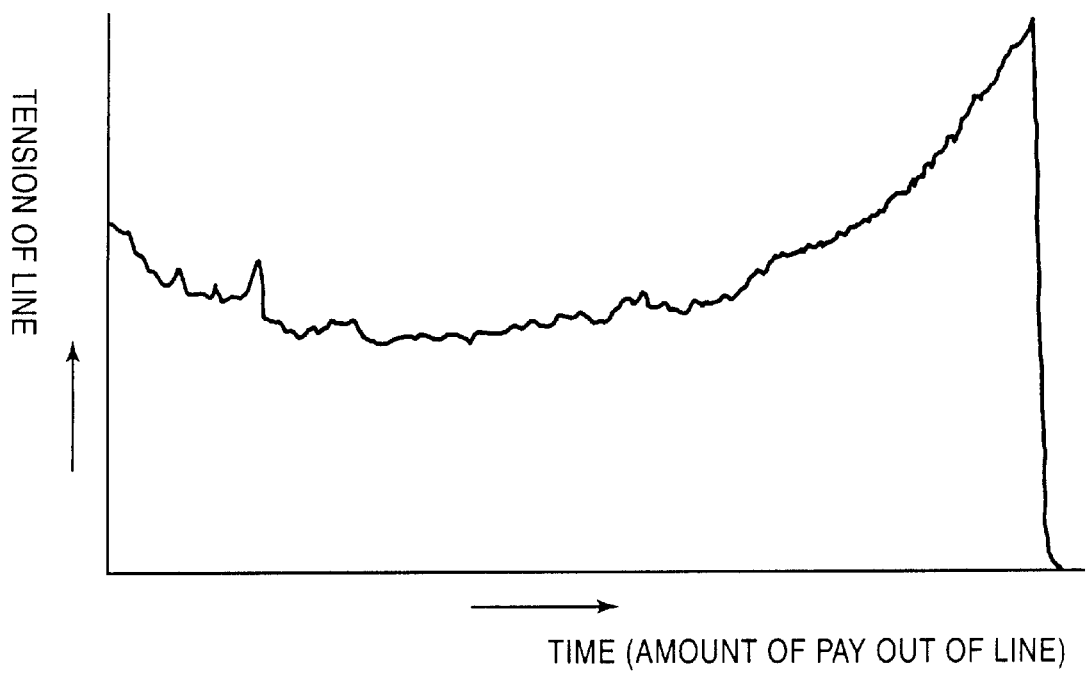
FIG. 24 is a graph showing relation between amount of pay out of the line and tension of the line in further customary double-bearing type reel.

In the double-bearing type reel of the present invention, thermal expansion of the outer ring 7 and the inner shaft 6 is utilized to prevent fluctuation of the maximum tension acting on the line, similarly to the customary double-bearing type reel. Since the outer ring 7 and the inner shaft 6 are made of the same kind of material, as amount of pay out of the line increases and the diameter of winding on the spool 1 becomes smaller, the reverse torque for reversely rotating the spool 1 by tension of the line becomes smaller gradually, as shown in FIG. 22. Therefore, an abrupt change of the reverse torque as shown in FIG. 24 can be prevented, but as amount of pay out of the line increases, the reverse torque decreases.

Accordingly, in the present embodiment, the outer ring 7 is forcibly cooled by the radiating fin 32 and further radiation of the heat generated at the roll portion of the rollers 8 is promoted by the lubricating oil circulating through the circulation passage formed by the through holes 69 of the, inner shaft 6, so that the characteristic that the reverse torque decreases as amount of pay out of the line increases is adjusted in optimum.

The heat generated when the spool 1 is rotated reversely by the line, is effectively radiated from the outer ring 7 through the radiating fin 32. Though the radiating fin 32 is integrally formed on an outer peripheral surface of the casing 61 fitted on an outer surface of the outer ring 7 in this embodiment, the outer ring 7 and the casing may be formed integrally. In the drag mechanism 5 having the outer ring 7 cooled by the radiating fin 32, thermal expansion of the outer ring 7 is adjusted to be small by the radiating fin 32. Therefore, it can be prevented that tension of the line is lowered unnecessarily when the line is paid out from the spool 1. Namely, lowering of the tension curve on the right side in FIG. 22 can be reduced.

Figure 15:
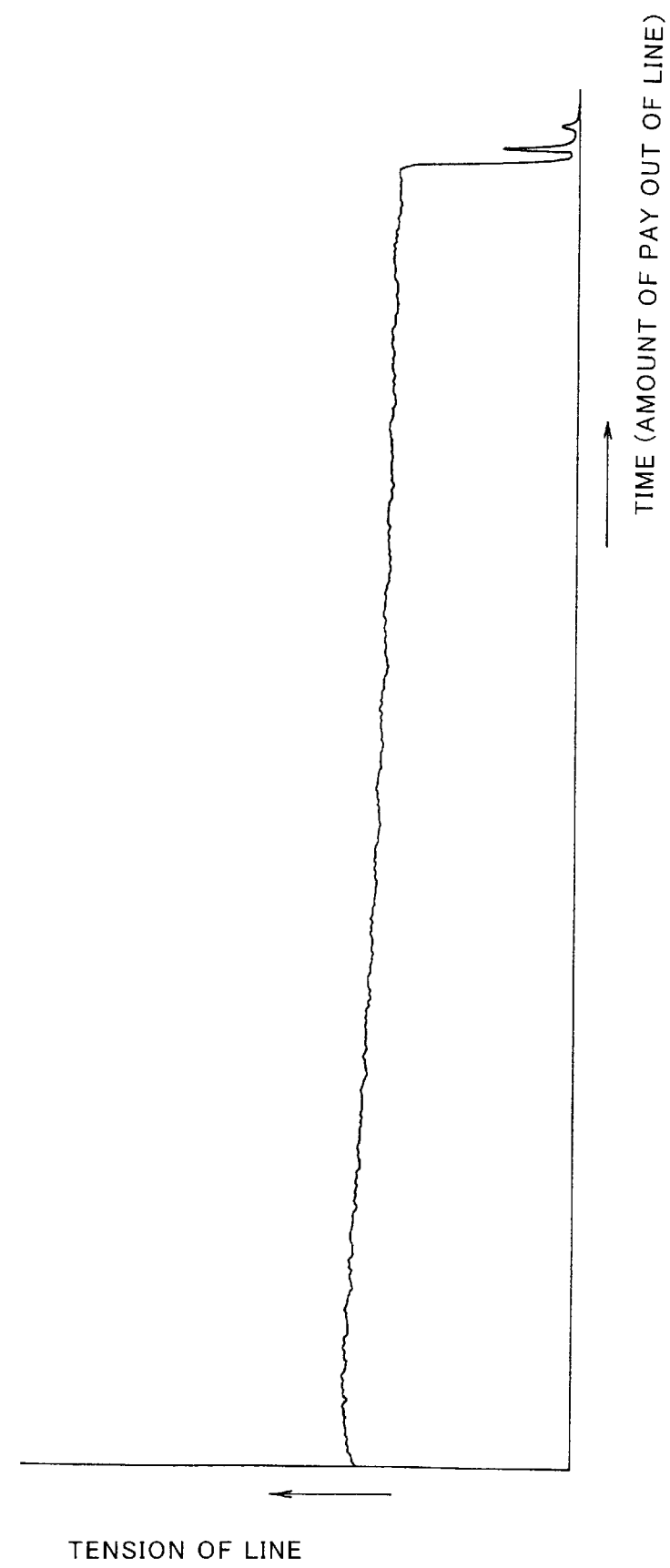
FIG. 15 is a graph showing relation between amount of pay out of the line and tension of the line in the double-bearing type reel of FIG. 1.
Figure 16:
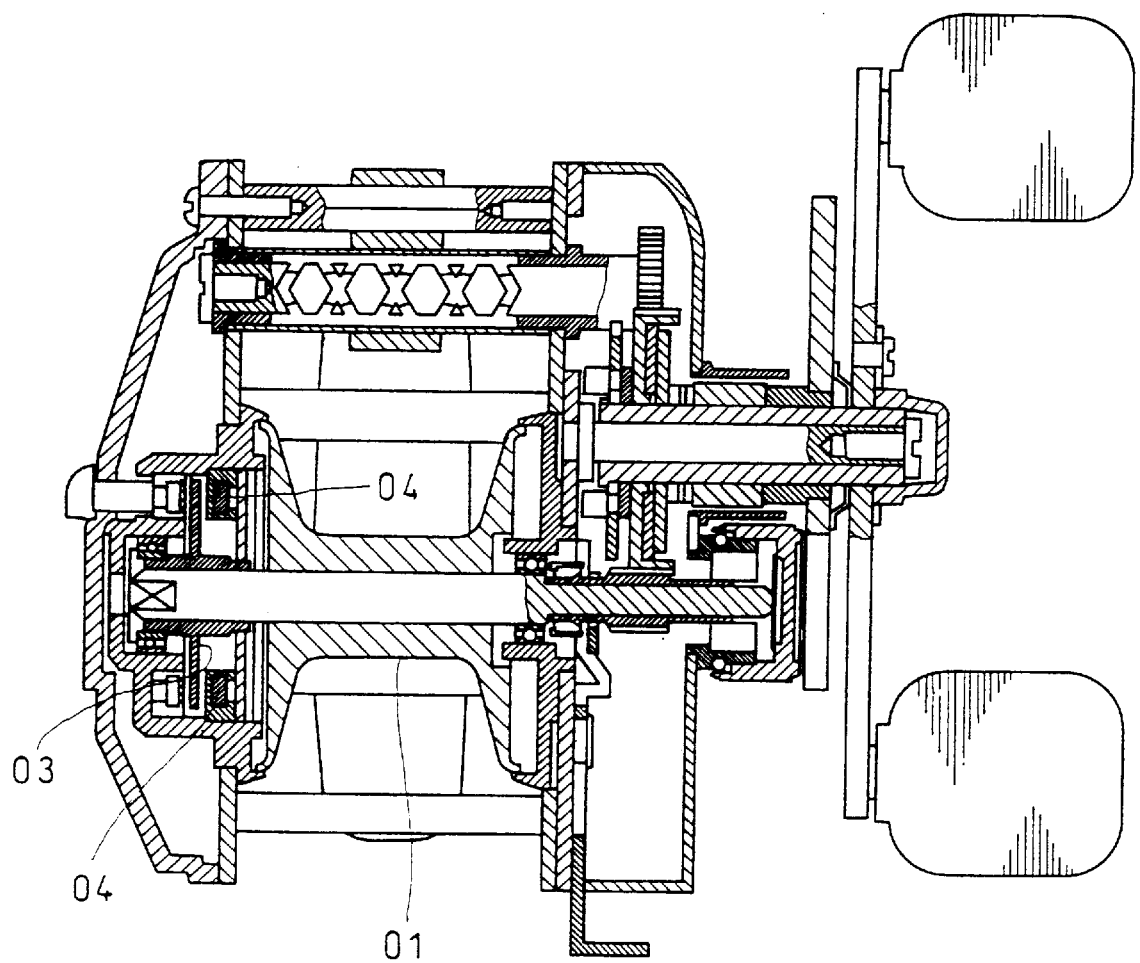
FIG. 16 is a vertical sectional view of a customary double-bearing type reel.
Figure 17:
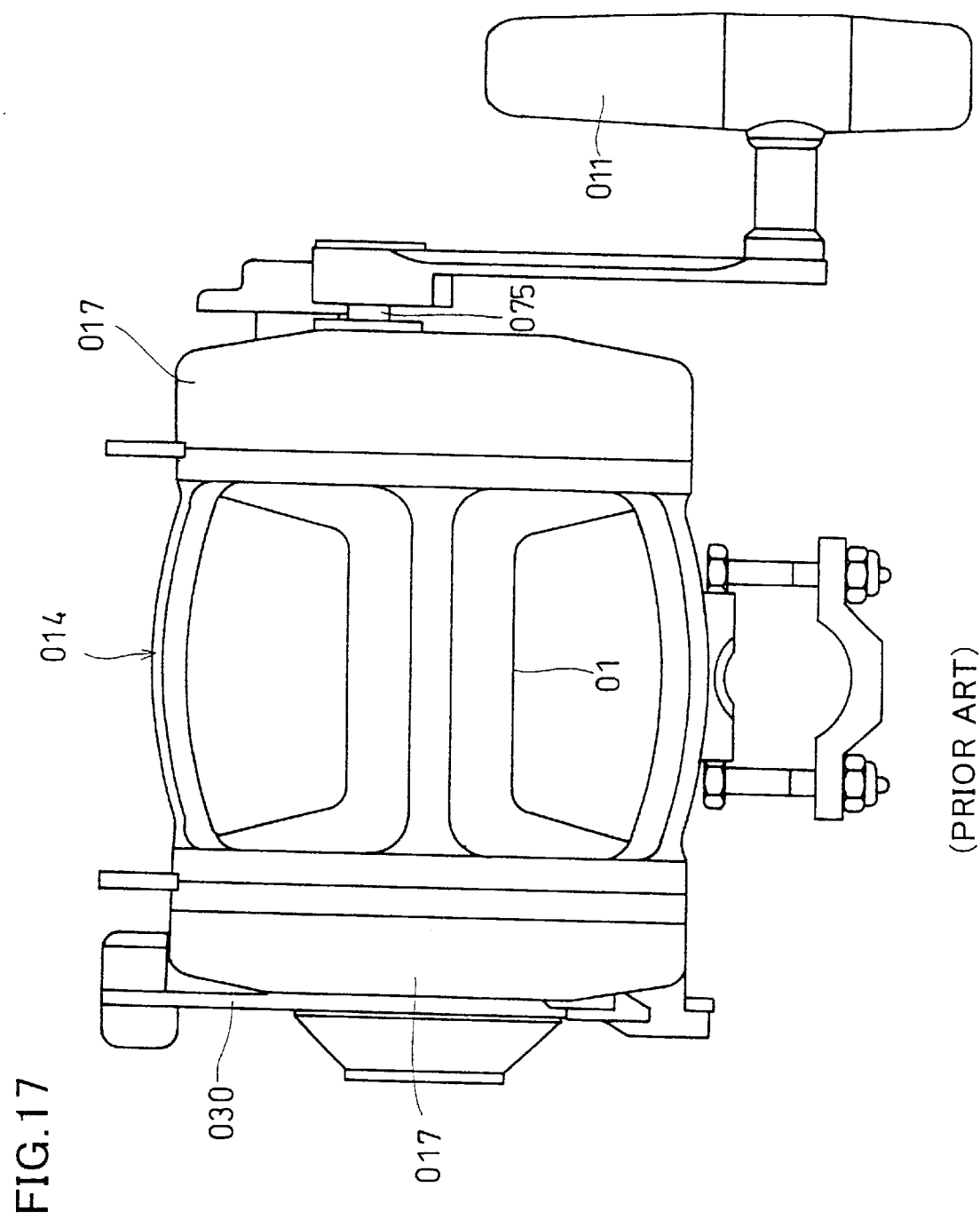
FIG. 17 is a front view of another customary double-bearing type reel.
Figure 18:
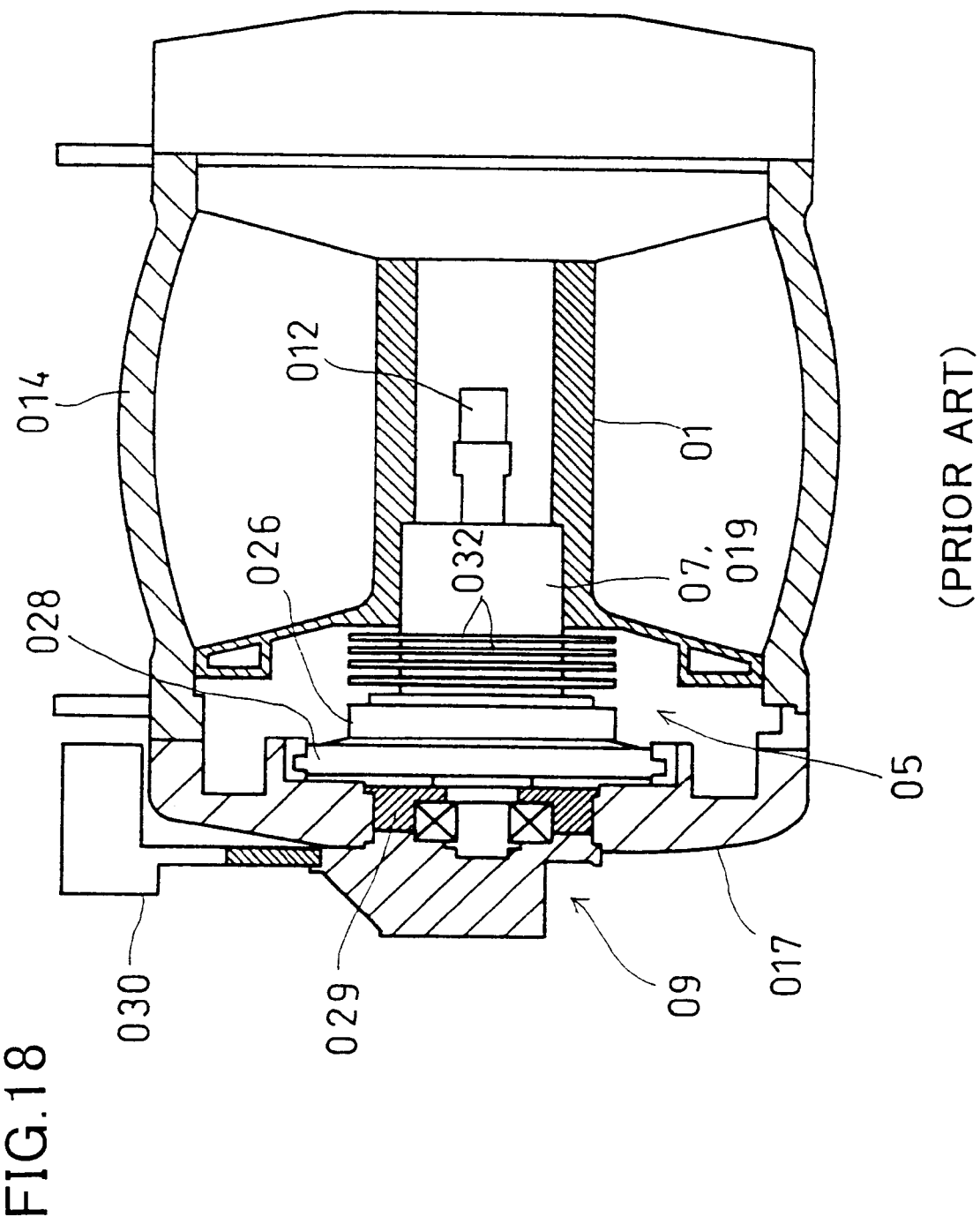
FIG. 18 is a partial vertical sectional view of FIG. 17.

The lubricating oil circulating to lubricate the roll portion of the rollers 8 (portion participating in rolling of the rollers 8) carries away the heat generated at the roll portion of the rollers 8 to promote radiation of the heat into the atmosphere through the wall portion surrounding the chamber E, especially through the radiating fin 61 of the outer ring 7 and the casing 61, so that the above-mentioned effect that lowering of the tension curve at the right side in FIG. 22 is reduced, can be enhanced further. FIG. 15 shows relation between amount of pay out of the line and tension of the line in this embodiment. As clear from this figure, the tension curve of the line can be unified ideally.

Figure 23:
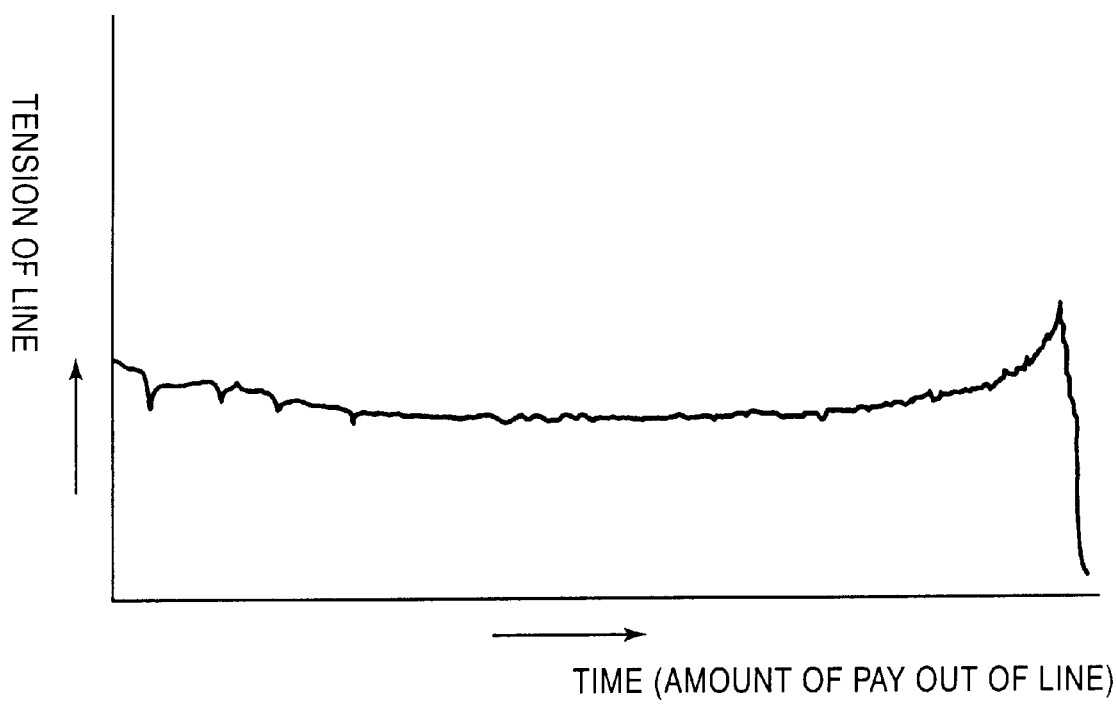
FIG. 23 is a graph showing relation between amount of pay out of the line and tension of the line in another customary double-bearing type reel.

The tension curve of the line of FIG. 23 corresponding to the case that the outer ring 7 is made of a material having thermal expansion coefficient smaller than that of the inner shaft 6, has a tendency to rise when the line is paid out long and the diameter of winding is reduced, and become maximum when the diameter of winding is extremely reduced. As compared with this, in the tension curve of the line of FIG. 15, the above tendency is dissolved thoroughly. In addition, instantaneous fluctuation of the line tension which occurs sometimes in course of pay out of the line and can not be ignored is flattened largely. It is to be noted that FIG. 15 is a graph showing result of an experiment in which the line was paid out during a time twice as long as FIG. 23.

As mentioned above, the double-bearing type reel of this embodiment has a feature that an ideal tension curve of the line can be obtained by providing the radiating fin 32 on the outer ring 7 for cooling, and forming the circulation passage of lubricating oil for lubricating the roll portion of the rollers 8. Area of the radiating fin 32 and material of the lubricating oil are selected and designed so that the tension curve of the line becomes flat.

In FIGS. 1, 2 and 5, 43 denotes an adjusting knob provided in the driving means 40 for carrying out gear change of the group of gears 41. 76 in FIGS. 3 and 5 denotes a click having a rod 76a within it. The rod 76a is energized by spring means 76b so as to enter and leave one of dents (not shown) formed on an annular end surface of the spool 1 circumferentially at regular intervals. The rod 76a clicks continuously when the spool 1 rotates, so that rotation of the spool 1 and amount of the rotation can be grasped roughly.

The double-bearing type reel of this embodiment exhibits the following effects.

As described above, the double-bearing type reel has a spool 1 for winding up a fishing line and a drag mechanism 5 slipping to rotate the spool 1 when a predetermined tension acts on the line wound round the spool 1. The drag mechanism 5 comprises an outer ring 7, an inner shaft 6, a plurality of rollers 8 arranged between the outer ring 7 and the inner shaft 6 so as to roll, and a torque adjusting section 9 for moving the outer ring 7 and the inner shaft 6 relatively in an axial direction. The rollers 8 are arranged between tapered roll surfaces 10 which are an inner circumferential surface of the outer ring 7 and an outer circumferential surface of the inner shaft 6 and have center axes inclined against center axes of the outer ring 7 and the inner shaft 6. The torque adjusting section 9 adjusts slip torque of the outer ring 7 and the inner shaft 6 by pressing the outer ring 7 and the inner shaft 6 so as to move relatively in the axial direction, thereby the outer ring 7 are slipped relatively by a tension exceeding a predetermined value acting on the line wound round the spool 1 to rotate the spool 1 and wind off the line. And in this double-bearing reel, a circulation passage of lubricating oil is provided between the outer ring 7 and the inner shaft 6 passing through between the rollers 8 and a plurality of through holes 69 formed in the inner shaft 6.

As the result, even in the heated state of the drag mechanism 5 that the rollers 8 are pressed against the roll surfaces 10 to heat the outer ring 7 and the inner shaft 6, the outer ring 7 and the inner shaft 6 are cooled uniformly and radiation from the outer surface of the outer ring 7 is promoted, because the lubricating oil circulates passing through between the rollers 8, between the outer ring 7 and the inner shaft 6 and the through holes 69 formed in the inner shaft 6 owing to pump action generated by rotation and revolution of the rollers 8. Accordingly, thermal expansion of the outer ring 7 and the inner shaft 6, especially thermal expansion of the outer ring 7 is restrained even if the outer ring 7 and the inner shaft 6 are made of the same material, so that it is possible to prevent lowering of the reverse torque of the spool 1 and the tension acting on the line when amount of pay out of the line increases and the diameter of winding of the line becomes small, and fluctuation of the line tension can be made about uniform. Therefore, the line is not drawn out by a large fish unnecessarily, and the large fish can be drawn near efficiently and recovered surely.

Since the outer ring 7 and the inner shaft 7 are cooled uniformly by circulation of the lubricating oil, the rollers 8 roll smoothly. Therefore, compared with the customary double-bearing type reel, instantaneous change of tension of the line can be made minute to smooth working of the double-bearing type reel. In addition, endurance of the line can be improved. Further, the inner shaft 6 and the entire double-bearing type reel are made light in weight, because the through holes 69 are formed in the inner shaft 6.

Since the radiating fin 32 is provided on the casing 61 fitted on the outer ring 7 to cool the outer ring 7 by radiation through the fin 32, when the line is drawn out from the spool 1 and the drag mechanism is heated, thermal expansion of the outer ring 7 is restrained more, so that it is possible to prevent lowering of the reverse torque of the spool 1 and the tension acting on the line more effectively when amount of pay out of the line increases and the diameter of winding of the line becomes small, and fluctuation of the line tension can be made uniform.

Since the radiating fin 32 is an annular or spiral thin plate fin having a plurality of cuts formed along the length of the fin and the cuts stir the air when the outer ring 7 rotates, cooling effect to the outer ring 7 can be improved and the above-mentioned effects can be enhanced more.

In the double-bearing type reel of this embodiment, since a plurality of coil springs 62 are provided for parting the outer ring 7 from the inner shaft 6 when the drag is released, the reel can be brought in a state of free spool surely when the drag is released, so that the line can be paid out without resistance surely in the state that the drag is not applied.

Furthermore, then coil springs 62 are disposed as follows. Namely, the connecting ring 19 and the connecting cylindrical portion 21 of the outer ring 7 is connected so as to rotate together but to move relatively to each other in the axial direction, by means of the steel ball 18 disposed in each pair of the connecting grooves 22, 22 formed on the outer circumferential surface of the connecting ring 19 and the inner circumferential surface of the connecting cylindrical portion, and a pair of grooves 63 each formed on the outer circumferential surface of the connecting ring 19 and the inner circumferential surface of the connecting cylindrical portion 21 for housing the coil spring 62 is disposed between the neighboring pairs of connecting grooves 22 arranged circumferentially.

As the result, the parting means (the grooves 63, 63 and the coil spring 62) and means for connecting the outer ring 7 and the connecting ring 19 so as to rotate together but to move relatively in the axial direction (the connecting grooves 22, 22 and the steel ball 18) can be incorporated within the drag mechanism 5 utilizing a vacant space, with minimum space, so as not to obstruct formation of the circulation passage of the lubricating oil, and with a reasonable layout. In addition, the construction can be simplified.

Since the casing 61 is fitted over the connecting ring 19 and the outer ring 7, the drag mechanism 5 can be sealed up easily for preventing sea water or foreign substances from invading and endurance of the double-bearing type reel can be improved.

The torque adjusting section 9 comprises the drag lever 30 provided outside of the side cover 17, the screw member 29 connected to the drag lever 30 integrally and penetrating the side cover 17 so as to rotate relatively, the nut member 28 provided inside of the side cover, engaging with the screw member 29 and adapted to be fixed so as not to rotate, and the transmission means for transmitting axial movement of the nut member 28 to the outer ring 7 through spring means, and the drag lever 30 has stopper means 70 capable of once stopping rotation in a direction to abruptly increase the slip torque of the outer ring 7 and the inner shaft 6.

As the result, since it is prevented by the stopper means that the drag lever 30 is rotated largely unexpectedly, no impacting tension acts on the line and breaking of the line can be prevented effectively.

The stopper means 70 has a handling section positioned near a handling section of the drag lever 30 so that the handling section of the stopper means 70 can be handled while the drag lever 30 is handled to rotate. Therefore, handling of the stopper means 70 is very easy.

The nut member 28 has the gear 64 formed on the outer periphery, the adjusting shaft member 66 having the gear 65 engaging with the gear 64 at the tip end is attached penetrating the side cover, and the adjusting shaft member 66 is handled from outside of the side cover 17 to rotate for adjusting the axial position of the nut member 28 so that the drag load can be corrected. Therefore, the drag load can be adjusted widely and very finely. For example, an initial set value of the drag lever can be corrected (pre-set) by rotary handling of the adjusting shaft member 66.

What is claimed is:

1. A double-bearing type reel having a spool for winding up a fishing line and a drag mechanism slipping to rotate said spool when a predetermined tension acts on the line wound round said spool:

said drag mechanism comprising an outer ring, and inner shaft, a plurality of rollers arranged between said outer ring and said inner shaft so as to roll, and a torque adjusting section for moving said outer ring and said inner shaft relatively in an axial direction said rollers being arranged between tapered roll surfaces which are an inner circumferential surface of said outer ring and an outer circumferential surface of said inner shaft, having center axes inclined against center axes of said outer ring and said inner shaft;

said torque adjusting section adjusting slip torque of said outer ring and said inner shaft by pressing said outer ring and said inner shaft so as to move relatively in the axial direction, thereby said outer ring and said inner shaft being slipped relatively by a tension exceeding a predetermined value acting on said line would round said spool to rotate said spool and wind off said line.

wherein a circulation passage of lubricating oil is provided between said outer ring and said inner shaft, said circulation passage including an interspace extending substantially axially between adjacent rollers of said plurality of rollers and communication oil passage connecting two axial ends of said interspace so as to enable flow of the lubricating oil through said interspace.

2. A double-bearing type reel as claimed in claim 1, wherein said inner shaft is formed with a plurality of through holes having both ends opened, extending in a direction of a center axis of said inner shaft and arranged circumferentially at regular intervals, so that said lubricating oil circulates through a space between said outer ring and said inner shaft and said through holes.

3. A double-bearing type reel as claimed in claim 1 or 2, wherein said outer ring has a radiating fin for cooling said outer ring, thereby thermal expansion of said outer ring is restrained when said line is paid out from said spool and said drag mechanism is heated.

4. A double-bearing type reel as claimed in claim 3, wherein said radiating fin is formed by an annular or spiral thin plate having a plurality of cuts disposed in a lengthwise direction.

5. A double-bearing type reel as claimed in claim 1, further comprising a lubricating oil housing chamber forming a part of said circulation passage.

6. A double-bearing type reel having a spool for winding up a fishing line and a drag mechanism slipping to rotate said spool when a predetermined tension acts on the line wound round said spool;

said drag mechanism comprising an outer ring, an inner shaft, a plurality of rollers arranged between said outer ring and said inner shaft so as to roll, and a torque adjusting section for moving said outer ring and said inner shaft relatively in an axial direction;

said rollers being arranged between tapered roll surfaces which are an inner circumferential surface of said outer ring and an outer circumferential surface of said inner shaft, having center axes inclined against center axes of said outer ring and said inner shaft;

said torque adjusting section adjusting slip torque of said outer ring and said inner shaft by pressing said outer ring and said inner shaft so as to move relatively in the axial direction, thereby said outer ring and said inner shaft being slipped relatively by a tension exceeding a predetermined value acting on said line wound round said spool to rotate said spool and wind off said line, wherein parting means for parting said outer ring and said inner shaft from each other when said drag mechanism is released is provided.

7. A double-bearing type reel as claimed in claim 6, wherein said outer ring is connected to said spool through a connecting ring which rotates integrally with said outer ring and is movable relatively to said outer ring in an axial direction, and said parting means includes spring means for forcing said outer ring so as to part from said connecting ring.

8. A double-bearing type reel as claimed in claims 7, wherein a plurality of connecting grooves are formed on an outer circumferential surface of said connecting ring, a plurality of connecting grooves are formed on an inner circumferential surface of a connecting cylindrical portion of said outer ring, a steel ball is disposed between each corresponding connecting grooves of said connecting ring and said connecting cylindrical portion to connect said connecting ring and said connecting cylindrical portion so as to rotate integrally with each other, corresponding dent grooves are formed on said outer circumferential surface of said connecting ring and said inner circumferential surface of said connecting cylindrical portion for receiving said spring means, said corresponding dent grooves are adjacent to said corresponding connecting grooves in a circumferential direction.

9. A double-bearing type reel as claimed in claim 7 or 8, wherein a casing is fitted over said connecting ring and said outer ring.

10. A double-bearing type reel as claimed in claim 9, wherein said casing has a radiating fin for cooling said outer ring, thereby thermal expansion of said outer ring is restrained when said line is paid out from said spool and said drag mechanism is heated.

11. A double-bearing type reel having a spool for winding up a fishing line and a drag mechanism slipping to rotate said spool when a predetermined tension acts on the line would round said spool;

said drag mechanism comprising an outer ring, and inner shaft, a plurality of rollers arranged between said outer ring and said inner shaft so as to roll, and a torque adjusting section for moving said outer ring and said inner shaft relatively in an axial direction;

said rollers being arranged between tapered roll surfaces which are an inner circumferential surface of said outer ring and an outer circumferential surface of said inner shaft, having center axes inclined against center axes of said outer ring and said inner shaft;

said torque adjusting section adjusting slip torque of said outer ring and said inner shaft by pressing said outer ring and said inner shaft so as to move relatively in the axial direction, thereby said outer ring and said inner shaft being slipped relatively by a tension exceeding a predetermined value acting on said line wound round said spool to rotate said spool and wind off said line, wherein said torque adjusting section comprises a drag lever provided outside of a side cover; a screw member fixed to said drag lever penetrating said side cover so as to rotate relatively; a nut member provided inside of said side cover to engage with said screw member; and transmission means for transmitting axial movement of said nut member to said outer ring through a spring means, and said drag lever has a stopper means capable of stopping rotation of said drag lever in a direction to abruptly increase slip torque of said other ring and said inner shaft.

12. A double-bearing type reel as claimed in claim 11, wherein said stopper means has a handling section positioned near a handling section of said drag lever, thereby said handling section of said stopper means can be operated concurrently with operation of said drag lever.

13. A double-bearing type reel as claimed in claim 11 or 12, wherein said nut member has a gear formed on an outer periphery, and an adjusting shaft member penetrating said side cover has a tip end formed with a gear for engaging with said gear of said nut member, thereby drag load can be corrected by operating said adjusting shaft member from outside of said side cover to adjust axial position of said nut member.

* * * * *